US012556888B2

(12) United States Patent
Yu et al.

(10) Patent No.: US 12,556,888 B2
(45) Date of Patent: Feb. 17, 2026

(54) COMMUNICATION METHOD AND APPARATUS

(71) Applicant: HUAWEI TECHNOLOGIES CO., LTD., Shenzhen (CN)

(72) Inventors: Haifeng Yu, Beijing (CN); Bingzhao Li, Beijing (CN); Jinhuan Xia, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 356 days.

(21) Appl. No.: 17/867,234

(22) Filed: Jul. 18, 2022

(65) Prior Publication Data

US 2022/0360951 A1 Nov. 10, 2022

Related U.S. Application Data

(63) Continuation of application No. PCT/CN2020/073326, filed on Jan. 20, 2020.

(51) Int. Cl.
*H04W 4/06* (2009.01)
*H04L 27/26* (2006.01)
(Continued)

(52) U.S. Cl.
CPC ......... *H04W 4/06* (2013.01); *H04L 27/26025* (2021.01); *H04W 72/0446* (2013.01); *H04W 72/23* (2023.01)

(58) Field of Classification Search
CPC ... H04W 4/06; H04W 72/0446; H04W 72/23; H04W 72/30; H04W 8/26; H04L 27/26025; H04L 2001/0093; H04L 1/1854
See application file for complete search history.

(56) References Cited

U.S. PATENT DOCUMENTS

2014/0226552 A1  8/2014  Niu et al.
2014/0241232 A1*  8/2014  Damji ............... H04L 25/0226
                                                      370/312
(Continued)

FOREIGN PATENT DOCUMENTS

CN  106470398 A  3/2017
CN  106470498 A  3/2017
(Continued)

OTHER PUBLICATIONS

3GPP TS 36.211 V16.0.0 (Dec. 2019), 3rd Generation Partnership Project; Technical Specification Group Radio Access Network; Evolved Universal Terrestrial Radio Access (E-UTRA); Physical channels and modulation (Release 16) (Year: 2019).*

(Continued)

*Primary Examiner* — Ricky Q Ngo
*Assistant Examiner* — David M Kayal
(74) *Attorney, Agent, or Firm* — HAUPTMAN HAM, LLP

(57) ABSTRACT

A network device sends multicast configuration information to a terminal device, where the multicast configuration information corresponds to a first multicast service, the multicast configuration information includes first indication information, and the first indication information indicates that the terminal device sends first feedback information for the first multicast service. The terminal device receives the first multicast service based on the first multicast configuration information, and then sends the first feedback information corresponding to the first multicast service to the network device based on the first indication information in the first multicast configuration information. The feedback mechanism applies to a multicast transmission technology and improves transmission reliability of a multicast service.

25 Claims, 23 Drawing Sheets

(51) Int. Cl.
 *H04W 72/0446* (2023.01)
 *H04W 72/23* (2023.01)

(56) References Cited

U.S. PATENT DOCUMENTS

| | | | | |
|---|---|---|---|---|
| 2016/0119395 | A1* | 4/2016 | Li | H04L 65/80 |
| | | | | 709/219 |
| 2017/0164407 | A1 | 6/2017 | Yang et al. | |
| 2017/0188333 | A1* | 6/2017 | Wu | H04W 72/30 |
| 2017/0290014 | A1* | 10/2017 | Kim | H04W 4/06 |
| 2018/0063683 | A1* | 3/2018 | Huang | H04W 72/23 |
| 2023/0422276 | A1* | 12/2023 | Park | H04W 72/30 |

FOREIGN PATENT DOCUMENTS

| | | |
|---|---|---|
| CN | 108540272 A | 9/2018 |
| CN | 109874113 A | 6/2019 |

OTHER PUBLICATIONS

Extended European Search Report issued in corresponding European Application No. 20915009.3, dated Nov. 4, 2022, pp. 1-10.
Kyocera, Radio interface enhancements for SC-PTM transmission. 3GPP TSG-RAN WG2 #89-bis , Bratislava, Slovak Republic, Apr. 20-24, 2015, R2-151535, 10 pages.
3GPP TS 36.213 V16.0.0 (Dec. 2019), 3rd Generation Partnership Project; Technical Specification Group Radio Access Network; Evolved Universal Terrestrial Radio Access (E-UTRA); Physical layer procedures(Release 16), 568 pages.
3GPP TS 36.331 V15.8.0 (Dec. 2019), 3rd Generation Partnership Project; Technical Specification Group Radio Access Network; Evolved Universal Terrestrial Radio Access (E-UTRA); Radio Resource Control (RRC); Protocol specification (Release 15), 964 pages.
Nokia Networks, Discussion and Working Assumptions for Single-cell PTM. 3GPP TSG-RAN WG2 Meeting #89bis, Bratislava, Slovakia, Apr. 20-24, 2015, R2-151591, 3 pages.
3GPP TS 36.211 V16.0.0 (Dec. 2019), 3rd Generation Partnership Project; Technical Specification Group Radio Access Network; Evolved Universal Terrestrial Radio Access (E-UTRA); Physical channels and modulation(Release 16), 247 pages.
International Search Report issued in corresponding International Application No. PCT/CN2020/073326, dated Oct. 22, 2020, pp. 1-9.

* cited by examiner

COMMUNICATION METHOD AND APPARATUS

CROSS-REFERENCE TO RELATED APPLICATIONS

This application is a continuation of International Application No. PCT/CN2020/073326, filed on Jan. 20, 2020, the disclosure of which is hereby incorporated by reference in its entirety.

BACKGROUND

In a wireless communication system, a multicast transmission technology can support point-to-multipoint communication, that is, a network device transmits same data to a plurality of terminal devices. A multicast transmission service is, for example, a mobile television service. Currently, there are two broadcast multicast service modes in a long term evolution (long term evolution, LTE) communication system: a multimedia broadcast multicast service (multimedia broadcast multicast service, MBMS) mode and a single-cell point-to-multipoint (single-cell point-to-multipoint, SC-PTM) mode. In response to the multicast transmission technology being used to transmit a multicast service, a terminal device first obtains multicast configuration information, and then receives the multicast service based on the multicast configuration information.

However, currently, the multicast transmission technology does not support hybrid automatic repeat request (hybrid automatic repeat request, HARQ) feedback. Consequently, reliability is low, and reliability requirements of a part of multicast services cannot be met in response to the multicast transmission technology being applied to a new radio access technology (new radio access technology, NR).

SUMMARY

At least one embodiment provides a communication method and apparatus, to implement a feedback mechanism applicable to multicast transmission, and improve transmission reliability of a multicast service.

In at least one embodiment, a communication method is provided. The method is applied to a terminal device, or is applied to a chip inside the terminal device. That the method is applied to the terminal device is used as an example. In the method, the terminal device receives first multicast configuration information from a network device, where the first multicast configuration information is for indicating to send first feedback information for a first multicast service, the first multicast configuration information corresponds to the first multicast service, the first multicast configuration information includes first indication information, and the first indication information is for indicating to send the first feedback information for the first multicast service. Further, the terminal device receives the first multicast service from the network device, and sends the first feedback information to the network device.

In this solution, In at least one embodiment, the terminal device provides a feedback for the multicast service; in another embodiment, because the first indication information indicates to provide a feedback for the first multicast service, the terminal device provides a feedback for the multicast service that has a high latency requirement and that is indicated by the network device, so that reliability of the multicast service with the high latency requirement is effectively improved.

In at least one embodiment, the first multicast configuration information further includes a group radio network temporary identifier (group radio network temporary identifier, G-RNTI) and/or a multicast service identifier that are/is associated with the first multicast service, and the G-RNTI and/or the multicast service identifier are/is associated with the first indication information.

In this way, because the first indication information is included in the first multicast configuration information, the first indication information is not separately sent, so that transmission resources is effectively reduced.

In at least one embodiment, the first indication information indicates, by using a bit or a field, to provide a feedback for the first multicast service.

In this way, after receiving the first indication information, the terminal device determines that the terminal device is to provide feedback for the first multicast service.

In at least one embodiment, the first indication information is for indicating a transmission resource of the first feedback information.

In this way, In at least one embodiment, after receiving the first indication information, the terminal device determines that the terminal device is to provide a feedback for the first multicast service; in another embodiment, the network device implicitly indicates transmission resource information of the terminal device by using downlink control information, so that transmission resources are effectively reduced.

In at least one embodiment, the first indication information includes a signal quality parameter threshold, and the terminal device determines, based on the signal quality parameter threshold, whether the feedback information is to be sent. Specifically, after receiving the first indication information, the terminal device sends the first feedback information to the network device in response to determining that a value of a signal quality parameter corresponding to the first multicast service being less than or equal to the threshold. Otherwise, the terminal device does not send the first feedback information.

In this way, the terminal device autonomously determines, based on a specific receiving status of the multicast service, whether to provide a feedback.

In at least one embodiment, the terminal device further receives second multicast configuration information from the network device, where the second multicast configuration information corresponds to a second multicast service, the second multicast configuration information includes second indication information, and the second indication information is for indicating that the terminal device does not send feedback information for the second multicast service. In this way, after receiving the second multicast service, the terminal device does not provide a feedback.

In this way, the terminal device provides a feedback for only the service with the high latency requirement, so that information transmission reliability is improved, and transmission resources is reduced.

In at least one embodiment, in response to a feedback resource of the first multicast service conflicting with a feedback resource of a unicast service, the terminal device determines, based on a priority of feedback information, whether to send the first feedback information of the first multicast service to the network device. In response to agreeing in advance in a protocol that a priority of feedback information of a multicast service is higher than a priority of feedback information of a unicast service, the terminal device sends the first feedback information corresponding to the first multicast service to the network device, and discard feedback information corresponding to the unicast service. In response to aggressing in advance in a protocol that a priority of feedback information of a multicast service is not higher than a priority of feedback information of a unicast service, the terminal device sends feedback information corresponding to the unicast service to the network device, and discards the first feedback information corresponding to the first multicast service.

In this way, the terminal device provides a feedback for the unicast service or the multicast service based on a protocol agreement, to resolve a resource conflict problem.

In at least one embodiment, the terminal device further receives third indication information from the network device, where the indication information is for indicating a priority of the feedback information of the multicast service. The third indication information is carried together with the multicast configuration information in downlink control information (downlink control information, DCI) or a radio resource control (radio resource control, RRC) message. In response to the third indication information, in response to the third indication information indicating that the priority of the feedback information of the first multicast service is a first priority (for example, a high-level priority), the terminal device preferentially sends the first feedback information corresponding to the first multicast service to the network device, and discards feedback information corresponding to the unicast service. In response to the third indication information indicating that the priority of the feedback information of the first multicast service is a second priority (for example, a low-level priority), the terminal device preferentially sends feedback information corresponding to the unicast service to the network device, and discards the first feedback information corresponding to the first multicast service.

In this way, the terminal device provides a feedback for the unicast service or the multicast service based on an indication of the network device, to resolve the resource conflict problem.

In at least one embodiment, the network device sends fourth indication information to the terminal device, where the fourth indication information is for triggering the terminal device to send feedback stopping acknowledgment information to the network device. Because the terminal device receives the fourth indication information, the terminal device is triggered to send the feedback stopping acknowledgment information to the network device. In this way, the terminal device stops, in a timely manner based on an indication of the network device, providing a feedback for the first multicast service. The terminal device releases a PUCCH resource configured for multicast feedback, so that resource utilization is improved. The fourth indication information is carried in DCI, an RRC message, or a media access control (media access control, MAC) control element (control element, CE).

In at least one embodiment, the feedback stopping acknowledgment information is in a MAC sub-protocol data unit (protocol data unit, PDU), where the MAC sub-PDU includes a MAC subheader and a MAC CE, and the MAC subheader includes a logical channel identifier (logical channel identifier, LCID). The feedback stopping acknowledgment information is indicated by the logical channel identifier LCID. For example, in response to the LCID taking a preset value (for example, the value of the LCID is 33), the LCID indicates that the terminal device stops sending the feedback information for the first multicast service. The feedback stopping acknowledgment information is indicated by a length of the MAC CE. For example, in response to the length of the MAC CE being a preset length, the MAC CE with the preset length is for indicating that sending of the feedback information for the first multicast service is stopped. The feedback stopping acknowledgment information is indicated by the multicast service identifier or the G-RNTI in the MAC CE.

At least one embodiment provides a communication method. The method is applied to a network device, or is applied to a chip inside the network device. That the method is applied to the network device is used as an example. In the method, the network device sends first multicast configuration information to a terminal device, where the first multicast configuration information corresponds to a first multicast service, the first multicast configuration information includes first indication information, and the first indication information is for indicating to send first feedback information for the first multicast service. Then, the network device sends the first multicast service to the terminal device, and receives the first feedback information from the terminal device.

In at least one embodiment, the communication method corresponds to the communication method described in the first aspect. Therefore, for related beneficial effects of the communication method, refer to the first aspect. Details are not described herein again.

In at least one embodiment, the first multicast configuration information further includes a group radio network temporary identifier G-RNTI and/or a multicast service identifier that are/is associated with the first multicast service, and the G-RNTI and/or the multicast service identifier are/is associated with the first indication information.

In at least one embodiment, the first indication information indicates, by using a bit or a field, to provide a feedback for the first multicast service; and/or the first indication information is for indicating a transmission resource of the first feedback information.

In at least one embodiment, the network device determines, based on at least one of a service requirement of the first multicast service, a physical relative distance between the terminal device and the network device, and channel quality of the terminal device, the terminal device that sends the feedback information for the first multicast service.

In at least one embodiment, the network device sends second multicast configuration information to the terminal device, where the second multicast configuration information corresponds to a second multicast service, the second multicast configuration information includes second indication information, and the second indication information is for indicating that the terminal device does not send feedback information for the second multicast service.

In at least one embodiment, before receiving the first feedback information from the terminal device, the network device sends third indication information to the terminal device, where the third indication information is for indicating a priority of the feedback information of the first multicast service. The third indication information is carried in downlink control information DCI, and the DCI is for scheduling a physical downlink shared channel PDSCH that carries the first multicast service.

In at least one embodiment, the network device sends fourth indication information to the terminal device, where the fourth indication information is for indicating the terminal device to stop sending the feedback information for the first multicast service; and receives feedback stopping acknowledgment information from the terminal device, where the feedback stopping acknowledgment information is for indicating that the terminal device stops sending the feedback information for the first multicast service.

In at least one embodiment, the feedback stopping acknowledgment information is indicated by a logical channel identifier LCID, and the LCID is carried in a media access control MAC subheader; or the feedback stopping acknowledgment information is indicated by fifth indication information in a MAC control element CE; or the feedback stopping acknowledgment information is indicated by a length of a MAC CE.

In at least one embodiment, the network device receives feedback capability information from the terminal device, where the feedback capability information is for indicating a capability of sending unicast feedback information and multicast feedback information on a same feedback resource by the terminal device, the unicast feedback information is feedback information corresponding to a unicast service, and the multicast feedback information is feedback information corresponding to a multicast service.

At least one embodiment provides a first communication apparatus. The first communication apparatus is configured to perform the method according to at least one embodiment. The first communication apparatus includes modules configured to perform the method according to at least one embodiment, for example, include a processing module and a transceiver module. For example, the transceiver module includes a sending module and a receiving module. The sending module and the receiving module are different function modules, or are a same function module that implements different functions. For example, the first communication apparatus is a terminal device, or is a chip or another component disposed in the terminal device. For example, the communication device is the terminal device. An example in which the first communication apparatus is the terminal device is used below. For example, the transceiver module alternatively is implemented by a transceiver, and the processing module alternatively is implemented by a processor. Alternatively, the sending module is implemented by a transmitter, and the receiving module is implemented by a receiver. The transmitter and the receiver is different function modules, or is a same function module that implements different functions. In response to the first communication apparatus being the terminal device, the transceiver is implemented by, for example, an antenna, a feeder, and a codec in the terminal device. Alternatively, in response to the first communication apparatus being the chip disposed in the terminal device, the transceiver (or the transmitter and the receiver) is, for example, a communication interface in the chip, and the communication interface is connected to a radio frequency transceiver component in the terminal device, to implement information receiving and sending by using the radio frequency transceiver component. In at least one embodiment, the first communication apparatus is the terminal device including the processing module and the transceiver module is still used as an example for description.

The transceiver module is configured to receive first multicast configuration information from a network device, where the first multicast configuration information is for indicating to send first feedback information for a first multicast service, the first multicast configuration information corresponds to the first multicast service, the first multicast configuration information includes first indication information, and the first indication information is for indicating to send the first feedback information for the first multicast service.

The processing module is configured to determine, based on the first indication information, that the terminal device is to provide a feedback for the first multicast service.

The transceiver module is further configured to: receive the first multicast service from the network device, and send the first feedback information to the network device.

In at least one embodiment, the first multicast configuration information further includes a group radio network temporary identifier (group radio network temporary identifier, G-RNTI) and/or a multicast service identifier that are/is associated with the first multicast service, and the G-RNTI and/or the multicast service identifier are/is associated with the first indication information.

In at least one embodiment, the first indication information indicates, by using a bit or a field, to provide a feedback for the first multicast service.

In at least one embodiment, the first indication information is for indicating a transmission resource of the first feedback information.

In at least one embodiment, the first indication information includes a signal quality parameter threshold, and the receiving module determines, based on the signal quality parameter threshold, whether the feedback information is to be sent. Specifically, after the receiving module receives the first indication information, the processing module sends the first feedback information to the network device through the transceiver module in response to determining that a value of a signal quality parameter corresponding to the first multicast service is less than or equal to the threshold. Otherwise, the first feedback information is not sent.

In at least one embodiment, the transceiver module is further configured to receive second multicast configuration information from the network device, where the second multicast configuration information corresponds to a second multicast service, the second multicast configuration information includes second indication information, and the second indication information is for indicating that the terminal device does not send feedback information for the second multicast service. In this way, after receiving the second multicast service, the terminal device does not provide a feedback.

In at least one embodiment, in response to a feedback resource of the first multicast service conflicting with a feedback resource of a unicast service, the processing module determines, based on a priority of feedback information, whether to send the first feedback information of the first multicast service to the network device. In response to agreeing in advance in a protocol that a priority of feedback information of a multicast service is higher than a priority of feedback information of a unicast service, the transceiver module sends the first feedback information corresponding to the first multicast service to the network device, and discard feedback information corresponding to the unicast service. In response to agreeing in advance in a protocol that a priority of feedback information of a multicast service is not higher than a priority of feedback information of a unicast service, the transceiver module preferentially sends feedback information corresponding to the unicast service to the network device, and discards the first feedback information corresponding to the first multicast service.

In at least one embodiment, the transceiver module further receives third indication information from the network device, where the indication information is for indicating a priority of the feedback information of the multicast service. The third indication information is carried together with the multicast configuration information in downlink control information (downlink control information, DCI) or a radio resource control (radio resource control, RRC) message. In response to the third indication information, in response to the third indication information indicating that the priority of the feedback information of the first multicast service is a first priority (for example, a high-level priority), the processing module determines to preferentially send the first feedback information corresponding to the first multicast service to the network device through the transceiver module, and discard feedback information corresponding to the unicast service. In response to the third indication information indicating that the priority of the feedback information of the first multicast service is a second priority (for example, a low-level priority), the processing module determines to preferentially send feedback information corresponding to the unicast service to the network device through the transceiver module, and discard the first feedback information corresponding to the first multicast service.

In at least one embodiment, the transceiver module is further configured to send fourth indication information to the terminal device, where the fourth indication information is for triggering the terminal device to send feedback stopping acknowledgment information to the network device. Because the terminal device receives the fourth indication information, the terminal device is triggered to send the feedback stopping acknowledgment information to the network device. The fourth indication information is carried in DCI, an RRC message, or a media access control (media access control, MAC) control element (control element, CE). In this way, the terminal device stops, in a timely manner based on an indication of the network device, providing a feedback for the first multicast service. The terminal device releases a PUCCH resource configured for multicast feedback, so that resource utilization is improved.

In at least one embodiment, the feedback stopping acknowledgment information is in a MAC sub-protocol data unit (protocol data unit, PDU). The MAC sub-PDU includes a MAC subheader and a MAC CE, and the MAC subheader includes a logical channel identifier (logical channel identifier, LCID). In at least one embodiment, the feedback stopping acknowledgment information is indicated by the logical channel identifier LCID. For example, in response to the LCID taking a preset value (for example, the value is 33), the LCID indicates that the terminal device stops sending the feedback information for the first multicast service. In at least one embodiment, the feedback stopping acknowledgment information is indicated by a length of the MAC CE. For example, in response to the length of the MAC CE being a preset length, the MAC CE with the preset length is for indicating that sending of the feedback information for the first multicast service is stopped. In at least one embodiment, the feedback stopping acknowledgment information is indicated by the multicast service identifier or the G-RNTI in the MAC CE.

According to at least one embodiment, a second communication apparatus is provided. The second communication apparatus is configured to perform the method. The second communication apparatus includes modules configured to perform the method according to at least one embodiment, for example, includes a processing module and a transceiver module. For example, the transceiver module includes a sending module and a receiving module. The sending module and the receiving module are different function modules, or are a same function module that implements different functions. For example, the communication device is a network device. An example in which the second communication apparatus is the network device is used below. For example, the transceiver module alternatively is implemented by a transceiver, and the processing module alternatively is implemented by a processor. Alternatively, the sending module is implemented by a transmitter, and the receiving module is implemented by a receiver. The transmitter and the receiver are different function modules, or are a same function module that implements different functions. In response to the second communication apparatus being the network device, the transceiver is implemented by, for example, an antenna, a feeder, and a codec in the network device. Alternatively, in response to the second communication apparatus being a chip disposed in the network device, the transceiver (or the transmitter and the receiver) is, for example, a communication interface in the chip, and the communication interface is connected to a radio frequency transceiver component in the network device, to implement information receiving and sending by using the radio frequency transceiver component. In at least one embodiment, the second communication apparatus is the network device including the processing module, and the transceiver module is used as an example for description.

The processing module is configured to determine first multicast configuration information.

The transceiver module is configured to send the first multicast configuration information to a terminal device, where the first multicast configuration information corresponds to a first multicast service, the first multicast configuration information includes first indication information, and the first indication information is for indicating to send first feedback information for the first multicast service. Then, the transceiver module sends the first multicast service to the terminal device, and receives the first feedback information from the terminal device.

In at least one embodiment, the first multicast configuration information further includes a group radio network temporary identifier G-RNTI and/or a multicast service identifier that are/is associated with the first multicast service, and the G-RNTI and/or the multicast service identifier are/is associated with the first indication information.

In at least one embodiment, the first indication information indicates, by using a bit or a field, to provide a feedback for the first multicast service; and/or the first indication information is for indicating a transmission resource of the first feedback information.

In at least one embodiment, the processing module is configured to determine, based on at least one of a service requirement of the first multicast service, a physical relative distance between the terminal device and the network device, and channel quality of the terminal device, the terminal device that is to send the feedback information for the first multicast service.

In at least one embodiment, the transceiver module is further configured to send second multicast configuration information to the terminal device, where the second multicast configuration information corresponds to a second multicast service, the second multicast configuration information includes second indication information, and the second indication information is for indicating that the terminal device does not send feedback information for the second multicast service.

In at least one embodiment, before receiving the first feedback information from the terminal device, the transceiver module is further configured to send third indication information to the terminal device, where the third indication information is for indicating a priority of the feedback information of the first multicast service. The third indication information is carried in downlink control information DCI, and the DCI is for scheduling a physical downlink shared channel PDSCH that carries the first multicast service.

In at least one embodiment, the transceiver module is further configured to: send fourth indication information to the terminal device, where the fourth indication information is for indicating the terminal device to stop sending the feedback information for the first multicast service; and receive feedback stopping acknowledgment information from the terminal device, where the feedback stopping acknowledgment information is for indicating that the terminal device stops sending the feedback information for the first multicast service.

In at least one embodiment, the feedback stopping acknowledgment information is indicated by a logical channel identifier LCID, and the LCID is carried in a media access control MAC subheader; or the feedback stopping acknowledgment information is indicated by fifth indication information in a MAC control element CE; or the feedback stopping acknowledgment information is indicated by a length of a MAC CE.

In at least one embodiment, the transceiver module is further configured to receive feedback capability information from the terminal device, where the feedback capability information is for indicating a capability of sending unicast feedback information and multicast feedback information on a same feedback resource by the terminal device, the unicast feedback information is feedback information corresponding to a unicast service, and the multicast feedback information is feedback information corresponding to a multicast service.

At least one embodiment provides a communication apparatus. The communication apparatus is a terminal device or a chip inside the terminal device. The communication apparatus has a function of implementing the first aspect. For example, the communication apparatus includes a processor, and the communication apparatus further includes a transceiver. The transceiver is configured to receive and send signals, and the processor executes program instructions to complete the method according to at least one embodiment. The communication apparatus further includes one or more memories. The memory is configured to be coupled to the processor. The one or more memories are integrated with the processor, or are disposed independent of the processor. This is not limited in at least one embodiment. The memory stores a necessary computer program or necessary instructions for implementing the functions in the first aspect. The processor executes executes the computer program or the instructions stored in the memory. In response to the computer program or the instructions being executed, the communication apparatus is enabled to implement the method according to at least one embodiment.

In at least one embodiment, the communication apparatus includes a processor and a memory. The memory stores a necessary computer program or necessary instructions for implementing the functions in the first aspect. The processor executes the computer program or the instructions stored in the memory. In response to the computer program or the instructions being executed, the communication apparatus is enabled to implement the method according to at least one embodiment.

In at least one embodiment, the communication apparatus includes at least one processor and an interface circuit. The at least one processor is configured to: communicate with another apparatus via the interface circuit, and perform the method performed by the terminal device according to at least one embodiment.

At least one embodiment provides a communication apparatus. The communication apparatus is a network device or a chip inside the network device. The communication apparatus has a function of implementing the second aspect. For example, the communication apparatus includes a processor, and the communication apparatus further includes a transceiver. The transceiver is configured to receive and send signals, and the processor executes program instructions to complete the method according to at least one embodiment. The communication apparatus further includes one or more memories. The memory is configured to be coupled to the processor. The one or more memories are integrated with the processor, or are disposed independent of the processor. This is not limited in at least one embodiment. The memory stores a necessary computer program or necessary instructions for implementing the functions in the second aspect. The processor executes the computer program or the instructions stored in the memory. In response to the computer program or the instructions being executed, the communication apparatus is enabled to implement the method according to at least one embodiment.

In at least one embodiment, the communication apparatus includes a processor and a memory. The memory stores a necessary computer program or necessary instructions for implementing the functions in the second aspect. The processor executes the computer program or the instructions stored in the memory. In response to the computer program or the instructions being executed, the communication apparatus is enabled to implement the method according to at least one embodiment.

In at least one embodiment, the communication apparatus includes at least one processor and an interface circuit. The at least one processor is configured to: communicate with another apparatus via the interface circuit, and perform the method according to at least one embodiment.

At least one embodiment provides a computer-readable storage medium. The computer storage medium stores computer-readable instructions; and in response to a computer reading and executing the computer-readable instructions, the computer is enabled to perform the method according to at least one embodiment.

At least one embodiment provides a computer program product. In response to a computer reading and executing the computer program product, the computer is enabled to perform the method according to at least one embodiment.

At least one embodiment provides a chip. The chip includes a processor. The processor is coupled to a memory, and is configured to read and execute a software program stored in the memory, to implement the method according to at least one embodiment.

At least one embodiment provides a communication system. The communication system includes a terminal device and a network device. The terminal device is configured to implement the method according to at least one embodiment, and the network device is configured to implement the method according to at least one embodiment.

Embodiment are clearer and more comprehensible in the following descriptions.

DETAILED DESCRIPTION OF EMBODIMENTS

Figure 1:
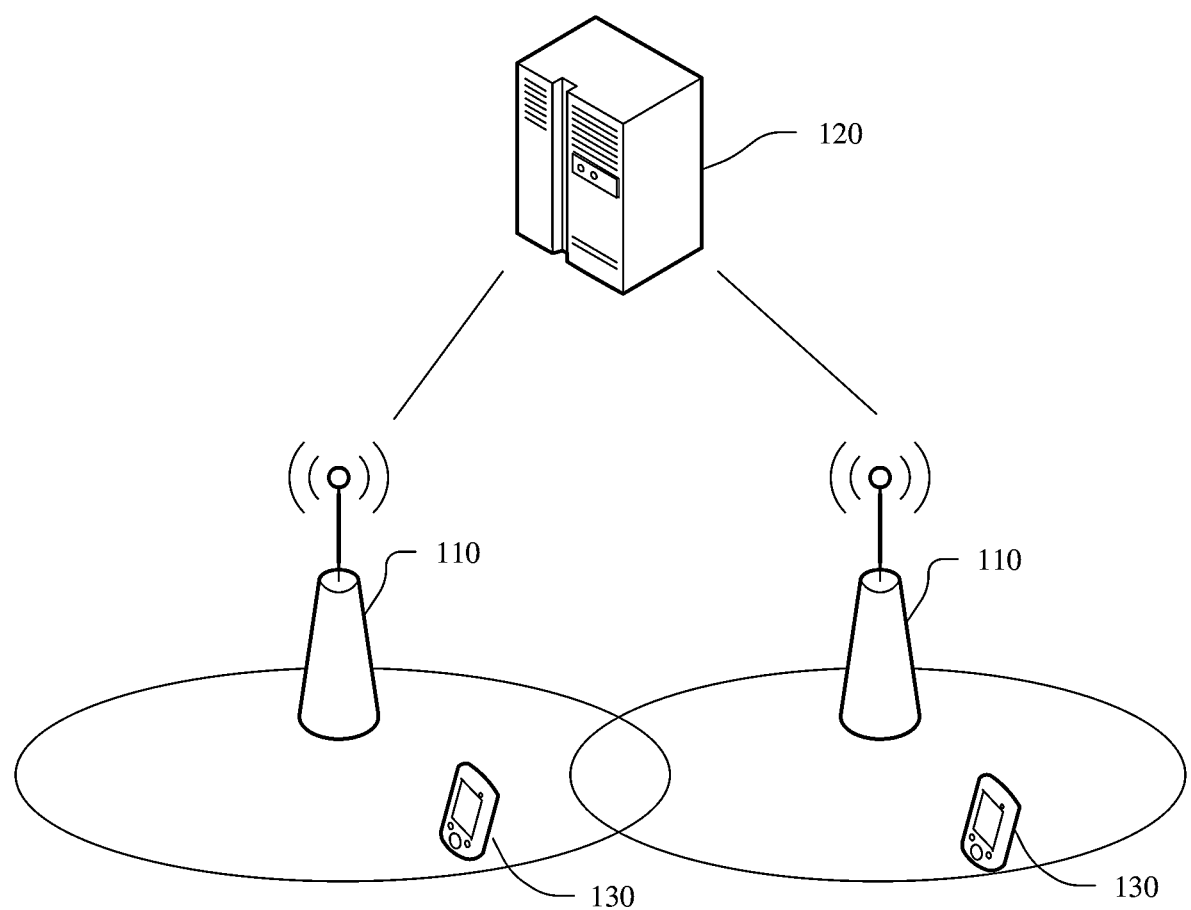
FIG. 1 is a schematic diagram of a network architecture according to at least one embodiment.

The following describes technical solutions in embodiments with reference to the accompanying drawings in embodiments. The described embodiments are merely some embodiments.

Some terms in embodiments are first described, to help a person skilled in the art have a better understanding.

(1) Terminal device: The terminal device is a wireless terminal device that receives scheduling information and indication information of a network device. The wireless terminal device is a device that provides voice and/or data connectivity for a user, a handheld device with a wireless connection function, or another processing device connected to a wireless modem. The terminal device communicates with one or more core networks or the Internet through a radio access network (radio access network, RAN). The terminal device is a mobile terminal device, for example, a mobile phone (or referred to as a "cellular" phone or a mobile phone (mobile phone)), a computer, and a data card. For example, the terminal device is a portable, pocket-sized, handheld, computer built-in, or in-vehicle mobile apparatus that exchanges voice and/or data with the radio access network. For example, the terminal device is a personal communication service (personal communication service, PCS) phone, a cordless phone, a session initiation protocol (SIP) phone, a wireless local loop (wireless local loop, WLL) station, a personal digital assistant (personal digital assistant, PDA), a tablet computer (Pad), or a computer having wireless receiving and sending functions. The wireless terminal device alternatively is referred to as a system, a subscriber unit (subscriber unit), a subscriber station (subscriber station), a mobile station (mobile station), a mobile station (mobile station, MS), a remote station (remote station), an access point (access point, AP), a remote terminal (remote terminal), an access terminal (access terminal), a user terminal (user terminal), a user agent (user agent), a subscriber station (subscriber station, SS), customer premises equipment (customer premises equipment, CPE), a terminal (terminal), user equipment (user equipment, UE), a mobile terminal (mobile terminal, MT), or the like. Alternatively, the terminal device is a wearable device, a terminal device in a next-generation communication system, for example, a 5G communication system, a terminal device in a future evolved public land mobile network (public land mobile network, PLMN), or the like.

(2) Network device: The network device is a device in a wireless network. For example, the network device is a radio access network (radio access network, RAN) node (or device) that enables a terminal device to access the wireless network, and also is referred to as a base station. Currently, some examples of the RAN device are: a next generation NodeB (generation NodeB, gNodeB) in a 5G communication system, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), a wireless fidelity (wireless fidelity, Wi-Fi) access point (access point, AP), and the like. In addition, in a network structure, the network device includes a centralized unit (centralized unit, CU) node, a distributed unit (distributed unit, DU) node, or a RAN device including a CU node and a DU node. In addition, the network device is another apparatus that provides a wireless communication function for the terminal device. A specific technology and a specific device form that are used by the network device are not limited in embodiments of this application. For ease of description, in embodiments of this application, an apparatus that provides a wireless communication function for a terminal device is referred to as a network device.

(3) Radio resource control (radio resource control, RRC) status: A terminal device has three RRC statuses: an RRC connected state (connected state), an RRC idle state (idle state), and an inactive state (inactive state).

RRC connected state (or is referred to as a connected state for short, where in this specification, the "connected state" and the "RRC connected state" are a same concept, and the two names are interchanged): The terminal device establishes an RRC connection to a network, and may perform data transmission.

RRC idle state (or is referred to as an idle state for short, where in this specification, the "idle state" and the "RRC idle state" are a same concept, and the two names is interchanged): The terminal device does not establish the RRC connection to the network, and a base station does not store a context of the terminal device. In response to the terminal device entering the RRC connected state from the RRC idle state, the terminal device initiates an RRC connection establishment process.

RRC inactive state (or is referred to as an inactive state for short, where in this specification, an "inactivated state", a "deactivated state", the "inactive state", the "RRC inactive state", and an "RRC deactivated state" are a same concept, and these names is interchanged): The terminal device previously enters the RRC connected state, and then the base station releases the RRC connection, but the base station stores the context of the terminal device. In response to the terminal device entering the RRC connected state again from the RRC inactive state, the terminal device initiates an RRC connection resume process (or referred to as an RRC connection reestablishment process). Compared with the RRC connection establishment process, the RRC connection resume process has a shorter latency and smaller signaling overheads. However, the base station stores the context of the terminal device, causing storage overheads of the base station.

(4) Terms "system" and "network" in embodiments of this application are used interchangeably. "At least one" means one or more, and "a plurality of" means two or more. The term "and/or" describes an association relationship between associated objects and indicates that three relationships exist. For example, A and/or B indicate the following cases: Only A exists, both A and B exist, and only B exists, where A and B is singular or plural. The character "/" generally indicates an "or" relationship between the associated objects. "At least one of the following items (pieces)" or a similar expression thereof means any combination of these items, including any combination of singular items (pieces) or plural items (pieces). For example, "at least one of A, B, and C" includes A, B, C, AB, AC, BC, or ABC.

In addition, unless otherwise stated, ordinal numbers such as "first" and "second" in embodiments of this application are used to distinguish between a plurality of objects, and are not used to limit an order, a time sequence, priorities, or importance of the plurality of objects. For example, a first threshold and a second threshold are merely used to distinguish between different thresholds, and do not indicate different priorities, different importance, or the like of the two thresholds.

The following further describes the technical solutions of this application in detail with reference to the accompanying drawings of this specification.

FIG. 1 is a schematic diagram of a network architecture according to at least one embodiment. As shown in FIG. 1, a terminal device 130 accesses a wireless network, to obtain a service of an external network (for example, the Internet) through the wireless network, or communicate with another device through the wireless network, for example, communicates with another terminal device. The wireless network includes a radio access network (radio access network, RAN) device 110 and a core network (core network, CN) device 120. The RAN device 110 is configured to enable the terminal device 130 to access the wireless network, and the CN device 120 is configured to manage the terminal device and provide a gateway for communicating with the external network. A quantity of devices in the communication system shown in FIG. 1 is understood as merely being used as an example. Embodiments of this application are not limited thereto. During actual application, the communication system further includes more terminal devices 130 and more RAN devices 110, and further includes another device.

A CN includes a plurality of CN devices 120. In response to the network architecture shown in FIG. 1 being applicable to a 5G communication system, the CN device 120 is an access and mobility management function (access and mobility management function, AMF) entity, a session management function (session management function, SMF) entity, a user plane function (user plane function, UPF) entity, or the like. In response to the network architecture shown in FIG. 1 being applicable to an LTE communication system, the CN device 120 is a mobility management entity (mobility management entity, MME), a serving gateway (serving gateway, S-GW), or the like.

Figure 2:
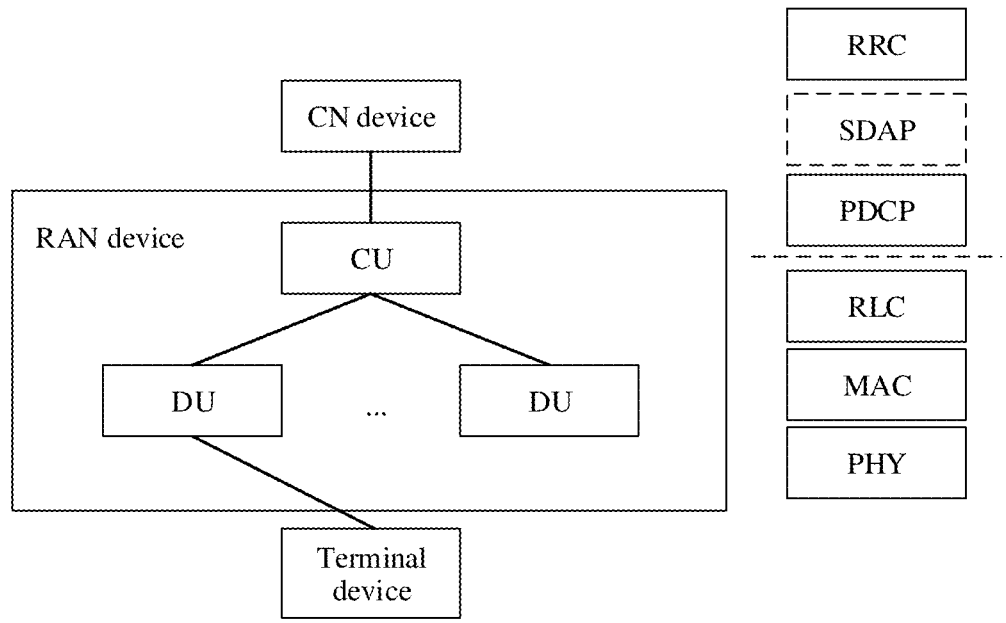
FIG. 2 is a schematic diagram of another network architecture according to at least one embodiment.

FIG. 2 is a schematic diagram of another network architecture according to at least one embodiment. As shown in FIG. 2, the network architecture includes a CN device, a RAN device, and a terminal device. The RAN device includes a baseband apparatus and a radio frequency apparatus. The baseband apparatus is implemented by one node, or is implemented by a plurality of nodes. The radio frequency apparatus is independently implemented remotely from the baseband apparatus or is integrated into the baseband apparatus, or some functions are independently integrated and some functions are integrated into the baseband apparatus. For example, in an LTE communication system, a RAN device (eNB) includes a baseband apparatus and a radio frequency apparatus. The radio frequency apparatus is remotely disposed relative to the baseband apparatus. For example, a remote radio unit (remote radio unit, RRU) is a remote radio unit disposed relative to a BBU.

Communication between the RAN device and the terminal device complies with a specific protocol layer structure. For example, a control plane protocol layer structure includes functions of protocol layers such as a radio resource control (radio resource control, RRC) layer, a packet data convergence protocol (packet data convergence protocol, PDCP) layer, a radio link control (radio link control, RLC) layer, a media access control (media access control, MAC) layer, and a physical layer. A user plane protocol layer structure includes functions of protocol layers such as the PDCP layer, the RLC layer, the MAC layer, and the physical layer. In at least one embodiment, a service data adaptation protocol (service data adaptation protocol, SDAP) layer is further included above the PDCP layer.

The RAN device implements functions of protocol layers such as the RRC layer, the PDCP layer, the RLC layer, and the MAC layer through one node or a plurality of nodes. For example, in an evolved structure, the RAN device includes a centralized unit (CU) and a distributed unit (DU), and a plurality of DUs are centrally controlled by one CU. As shown in FIG. 2, the CU and the DU are obtained through division based on a protocol layer of a wireless network. For example, functions of the PDCP layer and a protocol layer above the PDCP layer are set on the CU, and functions of protocol layers below the PDCP layer, such as the RLC layer and the MAC layer, are set on the DU.

Division based on the protocol layer is merely an example, and division alternatively is performed based on another protocol layer, for example, the RLC layer. Functions of the RLC layer and a layer above the RLC layer are set on the CU, and a function of a protocol layer below the RLC layer is set on the DU. Alternatively, division is performed at a protocol layer. For example, some functions of the RLC layer and a function of a protocol layer above the RLC layer are set on the CU, and a remaining function of the RLC layer and a function of a protocol layer below the RLC layer are set on the DU. In addition, division is alternatively performed in another manner. For example, division is performed based on a latency. A function whose processing time satisfies a latency requirement is set on the DU, and a function whose processing time does not satisfy the latency requirement is set on the CU.

In addition, the radio frequency apparatus is independently integrated but not disposed in the DU, or is integrated into the DU, or some remote parts are integrated into the DU. This is not limited herein.

Figure 3:
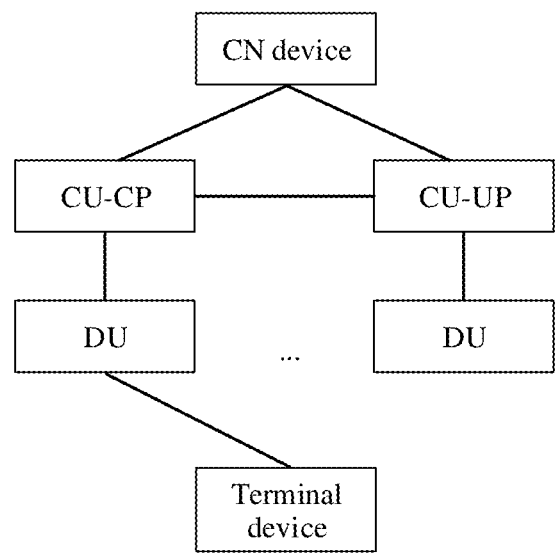
FIG. 3 is a schematic diagram of another network architecture according to at least one embodiment.

FIG. 3 is a schematic diagram of another network architecture according to at least one embodiment. Based on the network architecture shown in FIG. 2, in FIG. 3, a control plane (CP) and a user plane (UP) of the CU is further separated and implemented as different entities, which are separately a control plane (control plane, CP) CU entity (namely, a CU-CP entity) and a user plane (user plane, UP) CU entity (namely, a CU-UP entity).

In the foregoing network architecture, signaling generated by the CU is sent to the terminal device through the DU, or signaling generated by the terminal device is sent to the CU through the DU. The DU transparently transmits the signaling to the terminal device or the CU by directly encapsulating the signaling at a protocol layer without parsing the signaling. In the following embodiments, in response to transmission of such signaling between the DU and the terminal device being involved, sending or receiving of the signaling by the DU includes this scenario. For example, signaling at the RRC layer or the PDCP layer is finally processed as signaling at the PHY layer and sent to the terminal device, or is converted from received signaling at the PHY layer. In this architecture, the signaling at the RRC layer or the PDCP layer is sent by the DU, or sent by the DU and the radio frequency apparatus.

The network architecture shown in FIG. 1, FIG. 2, or FIG. 3 is applicable to communication systems of various radio access technologies (radio access technologies, RATs). For example, the communication system is an LTE communication system, or is a 5G (or referred to as new radio (new radio, NR)) communication system, or is a transition system between an LTE communication system and a 5G communication system, or certainly is a future communication system. The transition system is also referred to as a 4.5G communication system. Network architectures and service scenarios described in embodiments of this application are intended to describe the technical solutions in embodiments of this application more clearly, and do not constitute any limitation on the technical solutions provided in embodiments of this application. A person of ordinary skill in the art knows that, with evolution of the communication network architecture and emergence of new service scenarios, the technical solutions provided in embodiments of this application are also applicable to similar technical problems.

An apparatus in the following embodiments of this application is located in a terminal device or a network device based on a function implemented by the apparatus. In response to the foregoing CU-DU structure being used, the network device is a CU node, a DU node, or a RAN device including a CU node and a DU node.

In the network architecture shown in FIG. 1, FIG. 2, or FIG. 3, the network device transmits service data to a terminal device in a multicast mode, for example, implement multicast transmission by using an SC-PTM technology. In an SC-PTM broadcast mode, an access network device configures a single-cell multicast control channel (single-cell multicast control channel, SC-MCCH) by using a SIB, including a time domain position of the SC-MCCH. SC-PTM configuration information carried on the SC-MCCH includes configuration information of a single-cell multicast traffic channel (single-cell multicast traffic channel, SC-MTCH). The configuration information includes a temporary mobile group identity (temporary mobile group identity, TMGI), a session identifier (session ID), a G-RNTI for scrambling DCI, and configuration information of time domain discontinuous reception (discontinuous reception, DRX). The two logical channels SC-MCCH and SC-MTCH are mapped to a physical downlink shared channel (physical downlink shared channel, PDSCH) at a physical layer, and the DCI is carried on a physical downlink control channel (physical downlink control channel, PDCCH). In the SC-PTM technology, a physical downlink shared channel (physical downlink shared channel, PDSCH) is used to transmit a multicast service. The network device sends, to a group of terminal devices in a cell, downlink control information (downlink control information, DCI) carried on a physical downlink control channel (physical downlink control channel, PDCCH). The DCI is for scheduling a multicast PDSCH that carries a multicast service, and the DCI is scrambled by using a group radio network temporary identifier (group radio network temporary identifier, G-RNTI) associated with the multicast service. The terminal device obtains, by detecting the DCI scrambled by using the group radio network temporary identifier (Group radio network temporary identifier, G-RNTI), the physical downlink channel PDSCH scheduled by the DCI, and further obtains service data carried on the PDSCH.

Figure 4A:
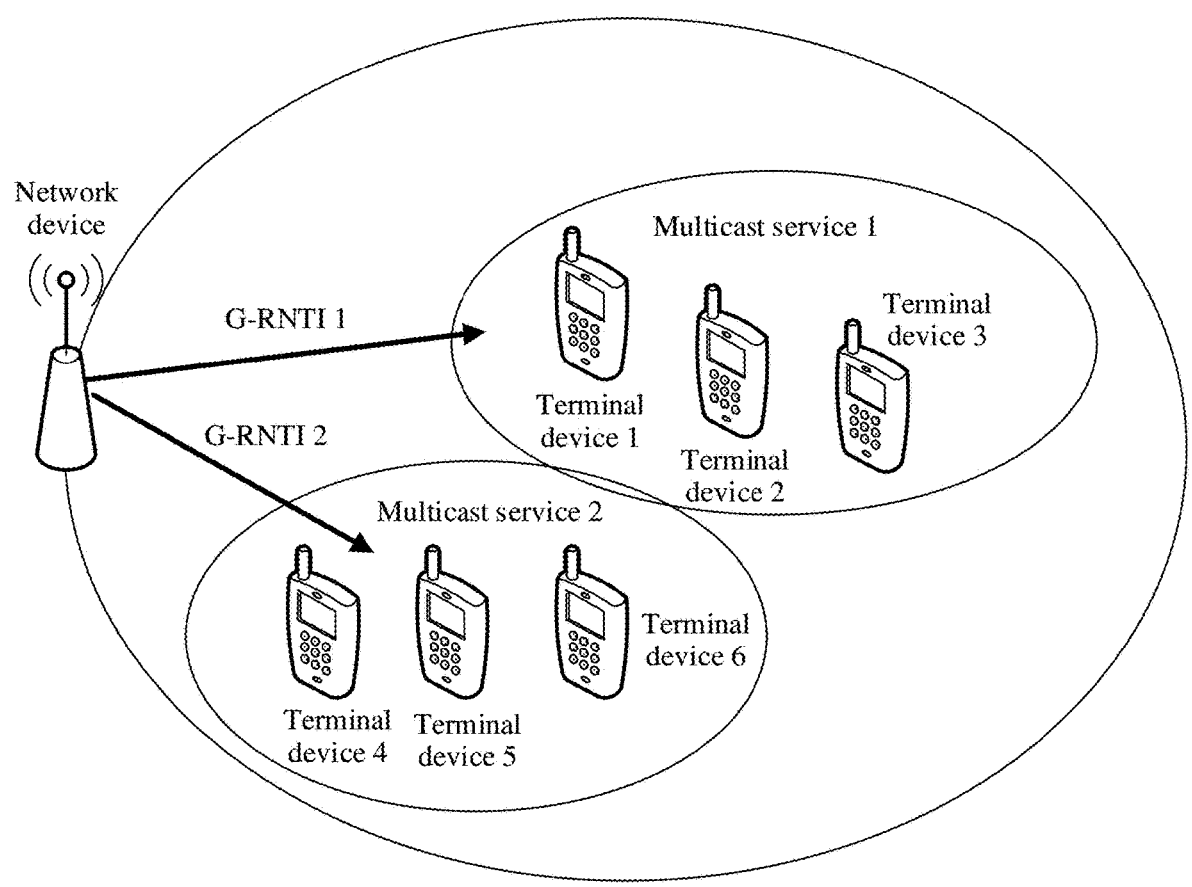
FIG. 4A is a schematic diagram of performing multicast service transmission by a network device.

FIG. 4A shows a case in which a network device transmits three multicast services. The network device allocates a G-RNTI 1 for a first multicast service, allocate a G-RNTI 2 for a second multicast service, and allocate a G-RNTI 3 for a third multicast service. To be specific, a G-RNTI associated with the first multicast service is the G-RNTI 1, a G-RNTI associated with the second multicast service is the G-RNTI 2, and a G-RNTI associated with the third multicast service is the G-RNTI 3. To receive the first multicast service and the second multicast service, a first group of terminal devices (including, for example, a terminal device 1, a terminal device 2, and a terminal device 3) obtain first multicast configuration information of the first multicast service, where the first multicast configuration information is for indicating the first group of terminal devices to receive the first multicast service (where for example, the first multicast configuration information includes the G-RNTI 1 associated with the first multicast service). Then, the first group of terminal devices receive, based on the G-RNTI 1, DCI 1 that is from the network device and that is for scheduling a multicast PDSCH 1 (where the multicast PDSCH 1 is for carrying the first multicast service), and receive the multicast PDSCH 1. Similarly, to receive the second multicast service, the first group of terminal devices (including, for example, the terminal device 1, the terminal device 2, and the terminal device 3) obtain second multicast configuration information of the second multicast service (where for example, the second multicast configuration information includes the G-RNTI 2 associated with the second multicast service), where the second multicast configuration information is for indicating the first group of terminal devices to receive the second multicast service. Then, the first group of terminal devices receive, based on the G-RNTI 2, DCI 2 that is from the network device and that is for scheduling a multicast PDSCH 2 (where the multicast PDSCH 2 is for carrying the second multicast service), and receive the multicast PDSCH 2.

Similarly, to receive the second multicast service, a second group of terminal devices (including, for example, a terminal device 4, a terminal device 5, and a terminal device 6) obtain the second multicast configuration information of the second multicast service (where for example, the second multicast configuration information includes the G-RNTI 2 associated with the second multicast service), where the second multicast configuration information is for indicating the second group of terminal devices to receive the multicast service 2. Then, the second group of terminal devices receive, based on the G-RNTI 2, the DCI 2 that is from the network device and that is for scheduling the multicast PDSCH 2 (where the multicast PDSCH 2 is for carrying the second multicast service), and receive the multicast PDSCH 2.

Figure 4B:
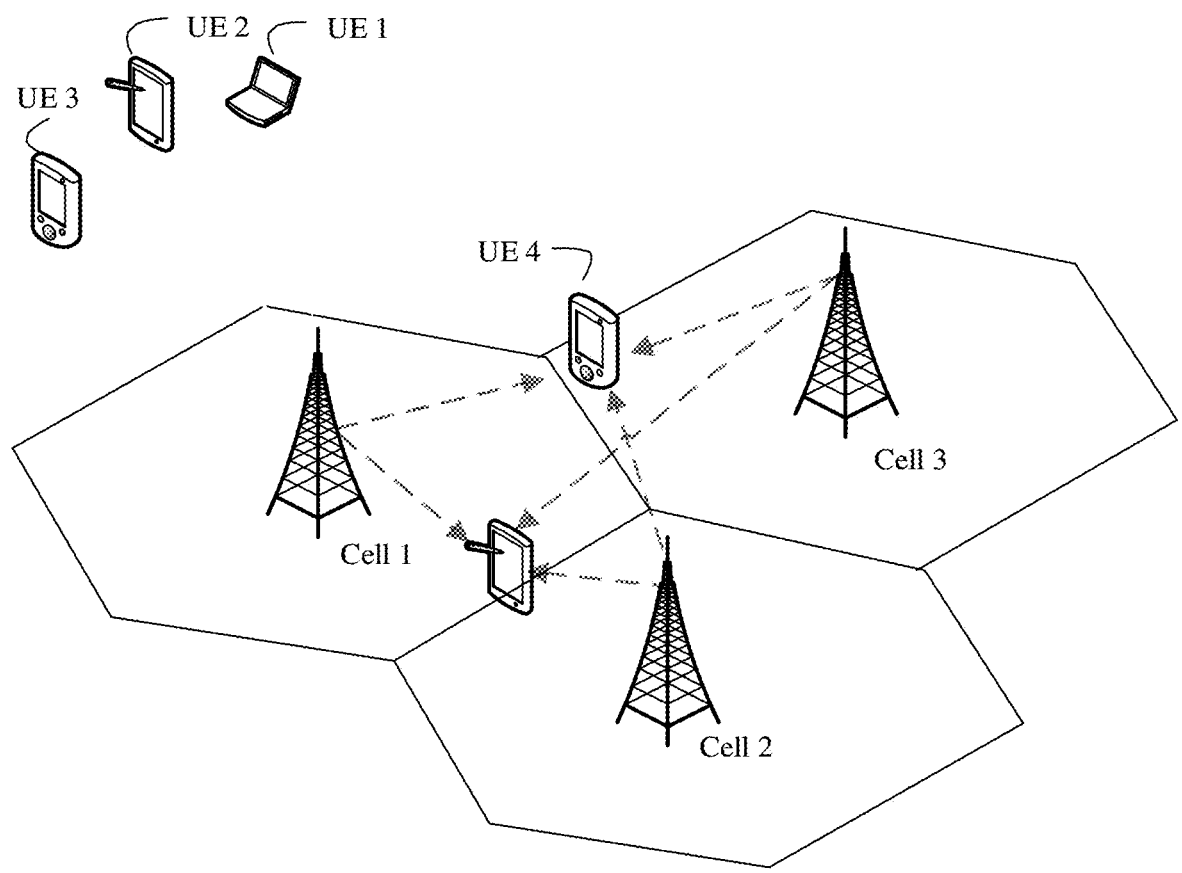
FIG. 4B is a schematic diagram of obtaining multicast configuration information by a terminal device.

For example, FIG. 4B is a schematic diagram of deployment of a mobile communication network, where the network includes one or more base stations. A base station manages one or more cells (cell). In FIG. 4B, an example in which one base station manages one cell is used. Several UEs are distributed in a cell. These UEs is connected to a base station through air interfaces (air interface), and receives a communication service after accessing the cell. Sports live broadcast is used as an example. Assuming that a plurality of user equipments simultaneously request a sports live broadcast service, the base station simultaneously transmits the same video content to the plurality of terminal devices (for example, UE 1, UE 2, and UE 3 in FIG. 4B) by using a point-to-multipoint multicast bearer PDSCH 1.

A multicast transmission technology effectively ensure service experience of a user, and a larger quantity of terminal devices brings higher network resource utilization. However, currently, the multicast transmission technology does not support hybrid automatic repeat request (hybrid automatic repeat request, HARQ) feedback. Consequently, after receiving a multicast service, a terminal device does not feed back whether the multicast service is correctly received. For some multicast services that have high reliability requirements, the current multicast transmission technology cannot meet the reliability requirements of these multicast services. Based on this, in embodiments of this application, the current multicast transmission technology is improved to support a feedback mechanism. In this way, the terminal device provides, based on indication information of a network device, a feedback for a multicast service for which a feedback is to be provided, so that reliability of the multicast service is improved.

The following describes in detail, with reference to the accompanying drawings, a process in which a terminal device provides a feedback for a multicast service.

Embodiment 1

Figure 5:
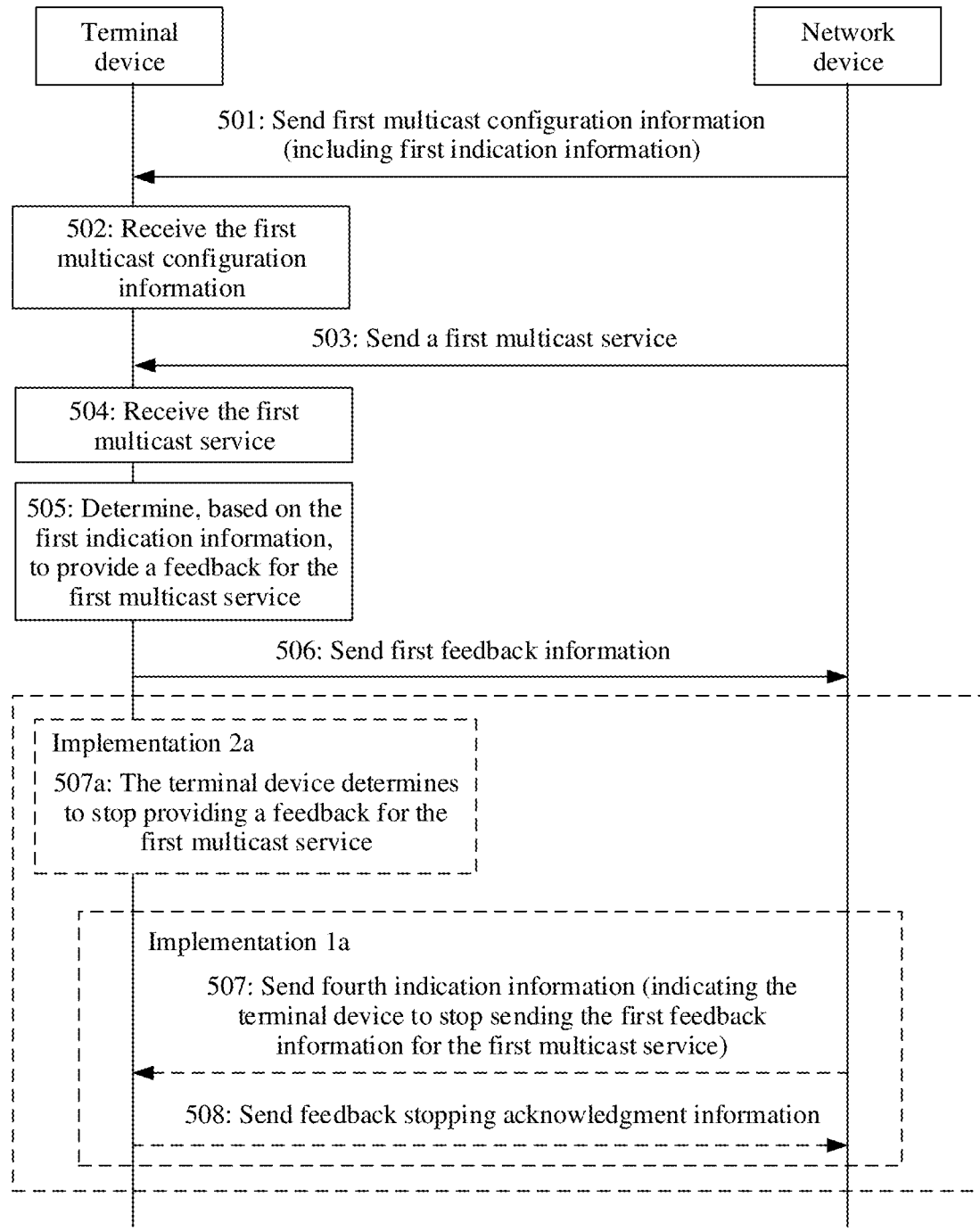
FIG. 5 is a schematic interaction diagram of a communication method according to at least one embodiment.

FIG. 5 is a schematic flowchart of a communication method according to this embodiment of this application. The method includes the following steps.

Step 501: A network device sends first multicast configuration information to a terminal device, where the first multicast configuration information corresponds to a first multicast service, the first multicast configuration information includes first indication information, and the first indication information is for indicating to send first feedback information for the first multicast service.

The first multicast configuration information is for indicating the terminal device to receive the first multicast service. Optionally, the first multicast configuration information is carried in an RRC message, system information, or a common channel. The first multicast configuration information is multicast configuration information corresponding to the first multicast service, and is for indicating the terminal device to receive the first multicast service based on the first multicast configuration information. The first multicast configuration information includes the first indication information. Generally, multicast configuration information further includes at least one of the following parameters: (1) a G-RNTI, (2) a multicast service identifier, (3) BWP information corresponding to the G-RNTI, (4) a PDSCH scrambling sequence of a multicast service, (5) a DRX parameter of the G-RNTI, (6) a demodulation reference signal, (7) a rate matching reference signal, (8) a radio bearer identifier, and (9) a security configuration identifier.

(1) The G-RNTI is in one-to-one correspondence with the multicast service. In this embodiment of this application, the first multicast configuration information further includes a G-RNTI 1 that is in one-to-one correspondence with the first multicast service. In other words, the G-RNTI 1 is equivalent to an identifier of the first multicast service. In this embodiment of this application, the first indication information is associated with the G-RNTI 1, that is, the first indication information corresponds to the first multicast service.

(2) The multicast service identifier includes an internet protocol (internet protocol, IP) address and/or a port number of the multicast service.

The multicast service identifier is sent by an application server to a core network device, and then the core network device sends the multicast service identifier to a network device. The multicast service identifier is alternatively a temporary mobile group identity (temporary mobile group identity, TMGI). In this embodiment of this application, the first multicast configuration information further includes an IP address and/or a port number of the first multicast service, and the first indication information is associated with the IP address and/or the port number of the first multicast service. The first indication information indicates the terminal device to send the first feedback information for a multicast service corresponding to a first IP address and/or a first port number.

(3) The BWP information corresponding to the G-RNTI includes at least one of the following: a bandwidth, a frequency position, a subcarrier spacing (subcarrier spacing, SCS), a cyclic prefix (cyclic prefix, CP) length, configuration information related to a control resource set (control resource set, CORESET), and configuration information related to a PDSCH. The CORESET information is for indicating a time-frequency resource on which a PDCCH scrambled by using the G-RNTI is located. In this embodiment of this application, the first multicast configuration information further includes BWP information corresponding to the G-RNTI 1.

(4) PDSCH scrambling sequence of the multicast service: A terminal device descrambles the PDSCH of the multicast service by using the PDSCH scrambling sequence.

(5) DRX parameter of the G-RNTI: The terminal device performs G-RNTI detection by using the DRX parameter.

(6) Demodulation reference signal: The terminal device demodulates, by using the demodulation reference signal, the PDSCH scheduled by using the G-RNTI.

(7) Rate matching reference signal: In response to receiving the PDSCH scheduled by using the G-RNTI, the terminal device excludes a position corresponding to the rate matching reference signal.

(8) The radio bearer identifier is for identifying a radio bearer corresponding to the first multicast service. The radio bearer is a data radio bearer, for example, a DRB (Data Radio Bearer), or a multicast radio bearer introduced for the multicast service, for example, an MRB (Multicast Radio Bearer).

(9) The security configuration identifier is for identifying a security configuration corresponding to the first multicast service, and the security configuration includes at least one of an encryption algorithm indication and an integrity protection algorithm indication.

In at least one embodiment, in step 501, the network device indicates, in the first indication information by using an explicit indication method or an implicit indication method, whether the terminal device sends the feedback information.

The network device sends, to the terminal device in any one or more of the following manners, the first indication information that is for indicating whether to provide a feedback for the first multicast service.

Manner 1

The first indication information explicitly indicates whether the terminal device provides feedback for the received first multicast service. For example, the network device indicates, in the first indication information by using one bit or one special field, the network device 1 to provide a feedback for the first multicast service.

The network device alternatively indicates, in the first indication information by using two or more bits, to provide a feedback for the first multicast service. Alternatively, the network device indicates, in the first indication information by using two or more fields, to provide a feedback for the first multicast service. This is not specifically limited in this embodiment of this application.

Manner 2

The first indication information implicitly indicates whether the terminal device provides feedback for the received first multicast service. For example, the network device 1 indicates, in the first indication information, a transmission resource of the first feedback information corresponding to the first multicast service. The transmission resource is for carrying the first feedback information of the terminal device for the first multicast service.

For example, in response to the network device configuring, for the terminal device, a PUCCH resource used for hybrid automatic repeat request (hybrid automatic repeat request, HARQ) feedback for the first multicast service, is equivalent to indicating that the terminal device provides feedback. The PUCCH resource is different from a PUCCH resource used for HARQ feedback on a unicast service.

Manner 3

The first indication information includes an auxiliary parameter, and the terminal device determines, based on the auxiliary parameter, whether to provide a feedback for the first multicast service. For example, the network device transmits a signal quality parameter threshold by using the first indication information. A signal quality parameter is at least one of the following: reference signal received power (reference signal received power, RSRP), reference signal received quality (reference signal received quality, RSRQ), a received signal strength indication (received signal strength indication, RSSI), channel quality information (channel quality information, CQI), and the like. After receiving the first indication information, the terminal device further determines, based on the threshold and a measured value of the signal quality parameter, whether to provide a feedback. For details, refer to the following step 504.

Manner 4

The network device indicates, in the first indication information with reference to at least two of the manner 1 to the manner 3, whether the terminal device provides feedback for the first multicast service.

For example, the network device indicates, with reference to the manner 1 and the manner 3, whether the terminal device provides a feedback. For example, the network device indicates, in the first indication information by using one bit or one field, that the terminal device provides feedback for the first multicast service, and the network device further indicates, in the first indication information, a transmission resource of the first feedback information corresponding to the first multicast service. Correspondingly, the terminal device determines, based on the bit or the field in the first indication information, that the terminal device provides feedback for the first multicast service, and sends the first feedback information to the network device on the transmission resource indicated in the first indication information.

In at least one embodiment, before performing step 501, the network device needs to determine the terminal device that provides feedback for the multicast service. A determining method used by the network device includes one or more of the following manners.

Manner 1

The network device determines, based on a service requirement of the multicast service corresponding to a group of terminal devices to which the terminal device belongs, the terminal device that provides a feedback for the multicast service. For example, the network device determines whether the multicast service sent by the network device to the terminal device is a multicast service that the terminal device is interested in. In response to the answer being yes, the network device determines that the terminal device provides a feedback for the multicast service. A group of terminal devices is a set of terminal devices that receive a same multicast service. For example, in FIG. 4A, the terminal device 1, the terminal device 2, and the terminal device 3 form the first group of terminal devices that receive a multicast service 1.

For example, in the foregoing embodiment, the group of terminal devices to which the terminal device belongs is the first group of terminal devices in FIG. 4A. an assumption is made that a service requirement of the first multicast service corresponding to the first group of terminal devices is a high reliability requirement.

In at least one embodiment, the network device determines that a part of terminal devices that are in the first group of terminal devices and that receive the first multicast service provides feedbacks for the first multicast service. The network device configures the part of terminal devices in the first group of terminal devices to provide feedbacks for the first multicast service, and configure the remaining part of terminal devices not to provide feedbacks for the first multicast service. In principle, because the service requirement of the first multicast service is the high reliability requirement, the network device configures terminal devices that receive the first multicast service to provide feedbacks. However, in consideration of at least one of feedback resources that is provided by a network, channel quality between the terminal devices and the network device, and receiving capabilities of the terminal devices, the network device selects a part of terminal devices and configures feedback resources for the part of terminal devices, so that receiving of the first multicast service is ensured, configurations of feedback resources are reduced, and resource utilization is improved.

In at least one embodiment, the network device determines that all terminal devices that are in the first group of terminal devices and that receive the first multicast service provides feedbacks for the first multicast service. The network device configures the terminal devices in the first group of terminal devices to provide feedbacks for the first multicast service.

Manner 2

The network device determines, based on a physical distance and/or a transmission distance between a terminal device and the network device, whether the terminal device provides a feedback for the multicast service.

For example, in response to the physical distance between the terminal device and the network device exceeding a specified threshold, the network device indicates that the terminal device provides a feedback for the received multicast service. On the contrary, in response to the physical distance between the terminal device and the network device not exceeding the specified threshold, the network device indicates that the terminal device does not provides a feedback for the received multicast service.

Manner 3

The network device determines, based on a channel quality status of a terminal device, whether the terminal device provides a feedback for the multicast service.

For example, the network device determines the channel quality status of the terminal device based on a transmission channel (for example, a PDSCH) corresponding to the first multicast service. In response to channel quality of the terminal device being poor, the network device indicates that the terminal device provides a feedback for the received multicast service. On the contrary, in response to the channel quality of the terminal device being good, the network device indicates that the terminal device does not provides a feedback for the received multicast service.

Step 502: The terminal device receives the first multicast configuration information.

In an example, the terminal device receives the first multicast configuration information from the network device through a radio resource control (radio resource control, RRC) connection.

In another example, the terminal device receives the first multicast configuration information from the network device by using the common channel or the system information.

In still another example, the terminal device receives the first multicast configuration information from the network device in a random access procedure.

Step 503: The network device sends the first multicast service to the terminal device.

Step 504: The terminal device receives the first multicast service based on the first multicast configuration information.

In at least one embodiment, in response to the first multicast configuration information further including the G-RNTI 1 associated with the first multicast service in addition to the first indication information, the terminal device descrambles, based on the G-RNTI 1, DCI 1 that is from the network device, and further receive the first multicast service carried on a multicast PDSCH 1, where the DCI 1 is for scheduling the multicast PDSCH 1.

Step 505: After receiving the first multicast service, the terminal device determines, based on the first indication information, whether to provide a feedback for the first multicast service. In response to the answer being yes, the terminal device performs a subsequent step. Otherwise, the terminal device stops performing the subsequent step.

In at least one embodiment, in step 505, the terminal device determines, based on the first indication information in any one or more of the following manners, whether to provide a feedback for the first multicast service.

Manner 1

The terminal device determines, based on a value of the bit that is in the first indication information and that corresponds to the first multicast service, whether to provide a feedback for the received first multicast service, or determines, based on the special field in the first indication information, whether to provide a feedback for the received first multicast service.

Specifically, after the terminal device receives the first indication information, and in response to the value of the bit that is in the first indication information and that corresponds to the terminal device being a first specified value (for example, "1"), the terminal device determines that the terminal device provides a feedback for the first multicast service. After the terminal device receives the first indication information, and in response to the value of the bit that is in the first indication information and that corresponds to the terminal device being a second specified value (for example, "0"), the terminal device determines that the terminal device does not provides a feedback for the first multicast service.

Alternatively, after the terminal device receives the first indication information, in response to the first indication information including a field that is agreed on in a protocol, the terminal device determines that the terminal device provides a feedback for the first multicast service. After the terminal device receives the first indication information, in response to the first indication information not including the field that is agreed on in the protocol, the terminal device determines that the terminal device does not provides a feedback for the first multicast service.

Manner 2

In response to determining that the first indication information indicates a transmission resource of the first multicast service, the terminal device provides a feedback for the received first multicast service. In response to determining that the first indication information does not indicate the transmission resource of the first multicast service, the terminal device does not provide a feedback for the received first multicast service.

Manner 3

After the terminal device receives the first indication information, in response to the first indication information including the signal quality parameter threshold, and the terminal device determines that the value of the signal quality parameter of the first multicast service is less than or equal to the threshold, the terminal device determines to provide a feedback for the first multicast service.

For example, the terminal device determines, based on at least one of the following conditions, that the terminal device provides a feedback for the first multicast service. Condition 1: An RSRP value of the first multicast service that is measured by the terminal device is less than or equal to an RSRP threshold. Condition 2: An RSRQ value of the first multicast service that is measured by the terminal device is less than or equal to an RSRQ threshold. Condition 3: An SINR value of the first multicast service that is measured by the terminal device is less than or equal to an SINR threshold. Condition 4: A CQI value of the first multicast service that is measured by the terminal device is less than or equal to a CQI threshold. Condition 5: An RSSI value of the first multicast service that is measured by the terminal device is less than or equal to an RSSI threshold.

Step 506: In response to determining that the terminal device provides a feedback for the first multicast service, the terminal device sends the first feedback information to the network device, where the first feedback information corresponds to the first multicast service.

The first feedback information sent by the terminal device to the network device is positive feedback information, for example, an acknowledgment (ACK), or is a negative acknowledgment (NACK). For example, in response to the terminal device correctly receiving the first multicast service, the terminal device sends the positive feedback information (the ACK) to the network device. In response to the terminal device not correctly receiving the first multicast service, the terminal device sends negative feedback information (the NACK) to the network device.

For example, from a perspective of the network device, the network device determines, based on the received first feedback information corresponding to the first multicast service, a mode (a unicast mode or a multicast mode) for resending the first multicast service. In an example, in response to a quantity of pieces of received NACK feedback information corresponding to the first multicast service being less than or equal to a threshold (where the threshold is a positive integer greater than or equal to 1), the network device resends, in the unicast mode, the first multicast service to a terminal that feeds back the NACK information. Otherwise, the network device resends the first multicast service in the multicast mode. In another example, the network resends the first multicast service in the multicast mode in response to receiving NACK feedback information corresponding to the first multicast service.

The following describes at least one embodiment in which the terminal device sends the first feedback information to the network device.

In at least one embodiment, the first indication information indicates the transmission resource of the first feedback information of the first multicast service. In this case, the terminal device sends the first feedback information to the network device on the transmission resource.

In at least one embodiment, the first indication information does not indicate the transmission resource of the first feedback information of the first multicast service, but the terminal device receives resource indication information from the network device, where the resource indication information indicates a transmission resource configured by the network device for the terminal device. In this case, the terminal device transmits the first feedback information on the transmission resource configured by the network device.

In at least one embodiment, the first indication information does not indicate the transmission resource of the first feedback information of the first multicast service. In this case, the terminal device sends the first feedback information to the network device on a transmission resource that is agreed on in the protocol.

In the foregoing embodiment, for the terminal device, the network device configures a PUCCH resource corresponding to the first feedback information, and the terminal device sends the first feedback information on the PUCCH resource. The terminal device further receives a unicast service from the network device, and the terminal device further provides a feedback for the unicast service. Consequently, a conflict occurs between a PUCCH resource used for HARQ feedback on the unicast service and the PUCCH resource used for the first feedback information. To resolve this problem, in response to a feedback resource of the first multicast service conflicting with a feedback resource of the unicast service, the terminal device determines, based on a priority of feedback information, whether to send the first feedback information of the first multicast service to the network device. Specifically, the terminal device determines, in either of the following two manners, how to provide feedbacks for the first multicast service and the unicast service.

Manner 1: The priority is predefined in the protocol.

In response to agreeing in advance in the protocol that a priority of feedback information of a multicast service is higher than a priority of feedback information of a unicast service, the terminal device sends the first feedback information corresponding to the first multicast service to the network device, and discard feedback information corresponding to the unicast service. In response to agreeing in advance in the protocol that a priority of feedback information of a multicast service is not higher than a priority of feedback information of a unicast service, the terminal device preferentially sends feedback information corresponding to the unicast service to the network device, and discards the first feedback information corresponding to the first multicast service.

Manner 2: The priority is indicated by the network device by using third indication information.

The terminal device receives the third indication information from the network device, where the indication information is for indicating a priority of the feedback information of the multicast service. The third indication information is carried together with the multicast configuration information in DCI or an RRC message. In response to the third indication information, in response to the third indication information indicating that the priority of the feedback information of the first multicast service is a first priority (for example, a high-level priority), the terminal device preferentially sends the first feedback information corresponding to the first multicast service to the network device, and discards feedback information corresponding to the unicast service. In response to the third indication information indicating that the priority of the feedback information of the first multicast service is a second priority (for example, a low-level priority), the terminal device preferentially sends feedback information corresponding to the unicast service to the network device, and discards the first feedback information corresponding to the first multicast service.

Optionally, the third indication information is indicated by using one bit or a plurality of bits. This is not limited herein. For example, in response to the third indication information being indicated by using one bit, in response to the bit being set to "0", the bit identifies the first priority; in response to the bit is set to "1", the bit identifies the second priority.

Optionally, the terminal device receives an information frame that is sent by the network device through a physical downlink control channel, where the information frame is downlink control information in format 1_0 or format 1_1, and the information frame includes the third indication information.

Optionally, in Embodiment 1, after step 506 is performed, the method further includes step 507*a*: The terminal device determines to stop providing a feedback for the first multicast service. Implementations in which the terminal device determines to stop sending the feedback information for the first multicast service include an implementation 1a and an implementation 2a.

Implementation 1a

The terminal device determines, based on fourth indication information sent by the network device, to stop sending the feedback information for the first multicast service. Correspondingly, step 507*a* includes step 507 and step 508.

Step 507: The network device sends the fourth indication information to the terminal device, where the fourth indication information is for indicating the terminal device to stop sending the feedback information for the first multicast service.

For example, the fourth indication information is carried in DCI, an RRC message, or a media access control (media access control, MAC) control element (control element, CE).

Optionally, the method further includes step 508: The terminal device sends feedback stopping acknowledgment information to the network device, where the feedback stopping acknowledgment information is for indicating that the terminal device stops sending the feedback information for the first multicast service.

Implementation 2a

Step 507*a* is specifically as follows: The terminal device determines, based on a predefined parameter, to stop providing a feedback for the first multicast service. The predefined parameter is duration of a first timer or a first count threshold.

In an example, the predefined parameter is the duration of the first timer. In response to the terminal device triggering the starting of the first timer by sending the feedback information, in response to the first timer expiring, the terminal device determines to stop providing a feedback for the first multicast service. In response to the terminal device subsequently sending the first feedback information on the feedback resource corresponding to the first multicast service, the terminal device triggers restarting of the first timer. In response to the first timer expiring, the terminal device determines to stop providing a feedback for the first multicast service.

In another example, the predefined parameter is the first count threshold. The first count threshold corresponds to a first counter, and an initial value of the first counter is 0. In response to content transmitted by the terminal device on the feedback resource corresponding to the first multicast service not including the first feedback information, the value of the first counter is increased by 1. In response to the value of the first counter being greater than or equal to the first count threshold, the terminal device determines to stop providing a feedback for the first multicast service. In addition, in response to the content transmitted by the terminal device on the feedback resource corresponding to the first multicast service including the first feedback information, the counter is reset.

In addition, according to the implementation 1a and the implementation 2a, once the terminal device determines to stop sending the feedback information for the first multicast service, the terminal device performs at least one of the following actions: Action 1: Stop sending the feedback information for the first multicast service. Action 2: Release the PUCCH resource configured for multicast feedback, to further improve resource utilization. Action 3: Indicate, to an upper layer, that feedback corresponding to the first multicast service has been stopped. The network device configures a feedback function and the feedback resource for the terminal device. However, in response to the terminal device not using the feedback resource for a long time, a waste of communication resources is caused. According to the communication method provided in this embodiment, a feedback resource with low utilization is released in time, so that resource utilization of a communication system is improved.

Figure 6A:
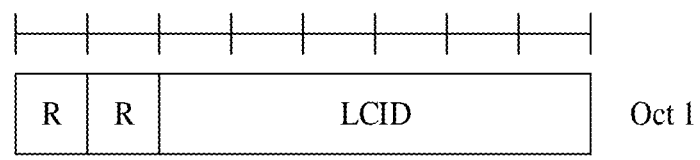
FIG. 6A and FIG. 6B are schematic diagrams of structures of MAC CEs according to at least one embodiment.

In at least one embodiment, in step 508, the feedback stopping acknowledgment information is carried in a MAC CE. A MAC CE has a corresponding MAC subheader, the MAC subheader includes a logical channel identifier (logical channel identifier, LCID), and the LCID is for identifying a corresponding MAC CE type. For the MAC subheader, refer to FIG. 6A. There are the following descriptions of two embodiments that correspond to different MAC CE formats:

Manner I:

A length of the MAC CE corresponding to the feedback stopping acknowledgment information is 0, and the MAC CE is indicated by the logical channel identifier LCID. For example, in response to the LCID taking a first preset value, the terminal device stops sending the feedback information for the first multicast service.

In at least one embodiment, the feedback stopping acknowledgment information is indicated by the length of the MAC CE. For example, if the length of the MAC CE is a first preset length, the MAC CE with the first preset length is for indicating that sending of the feedback information for the first multicast service is stopped.

Figure 6B:
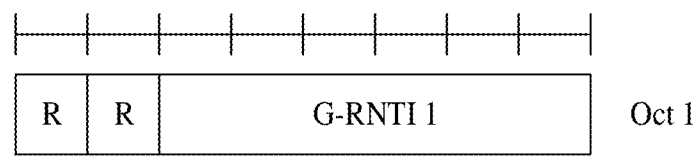

Manner II:

The feedback stopping acknowledgment information is indicated by fifth indication information in the MAC CE. The fifth indication information is the G-RNTI 1 associated with the first multicast service, or a service identifier of the first multicast service. For example, with reference to FIG. 6B, in response to the MAC CE carrying the G-RNTI 1, the terminal device stops providing a feedback for the first multicast service corresponding to the G-RNTI 1.

In at least one embodiment, the terminal device provides a feedback for the multicast service; in another embodiment, the terminal device provides a feedback for the first multicast service based on the first indication information, and the network device indicates, by using the first indication information, the terminal device to provide a feedback for the multicast service that has a high latency requirement, so that reliability of the multicast service with the high latency requirement is effectively improved, and configuration flexibility is improved.

Embodiment 2

Figure 7A:
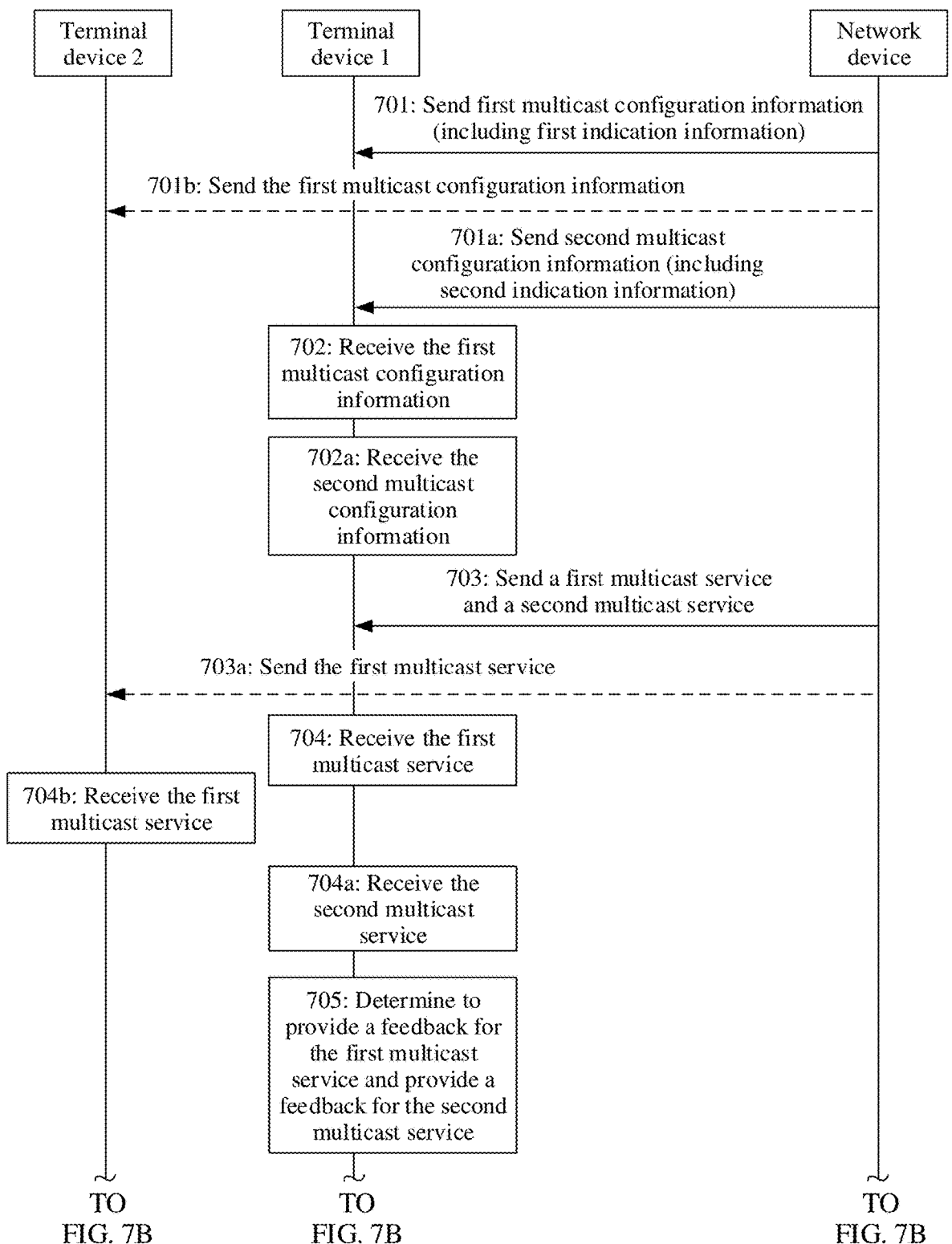
FIG. 7A to FIG. 10 are schematic interaction diagrams of other communication methods according to at least one embodiment.
Figure 7B:
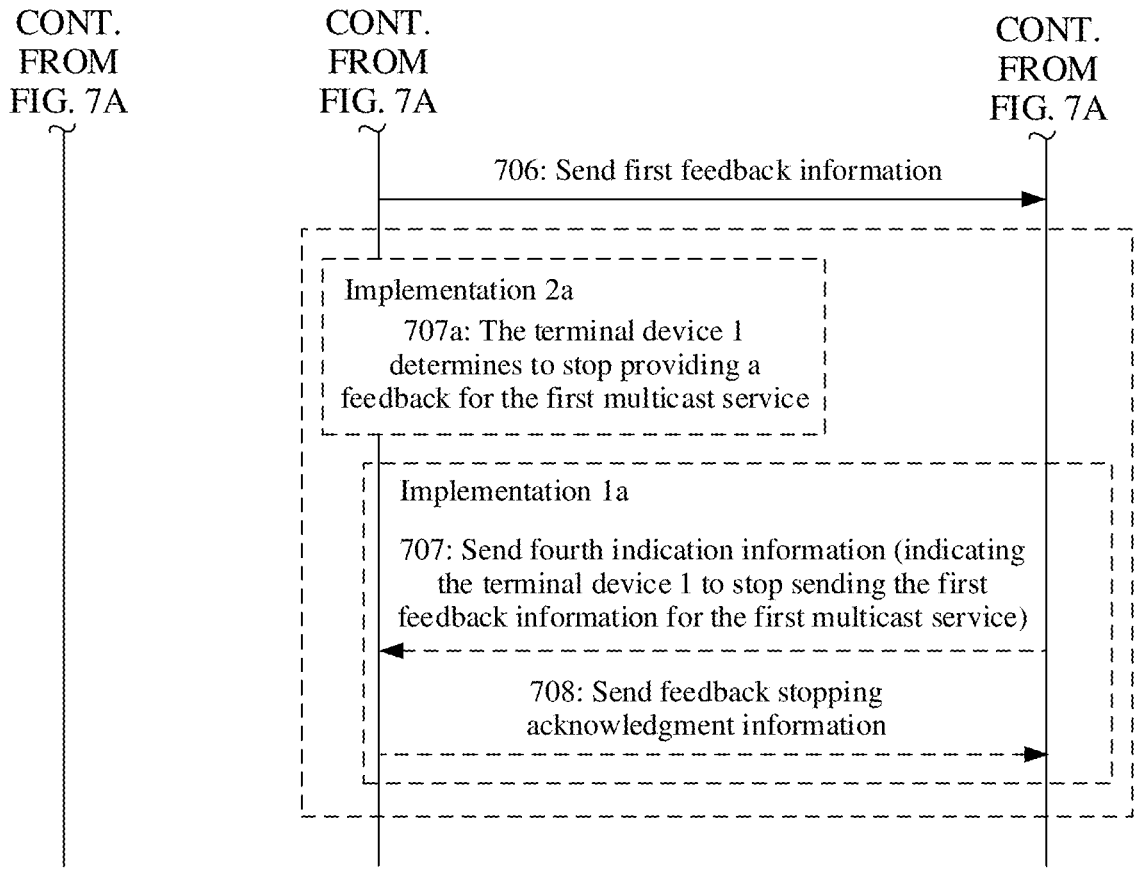

As shown in FIG. 7A and FIG. 7B, the communication method according to at least one embodiment further implements a feedback mechanism applicable to a plurality of multicast services, and a network device configures different feedback functions and/or feedback resources for different multicast services. The terminal device 1 in FIG. 4A is used as an example. The method includes the following steps.

Step 701: The network device sends first multicast configuration information to the terminal device 1, where the first multicast configuration information corresponds to a first multicast service, the first multicast configuration information includes first indication information, and the first indication information is for indicating to send first feedback information for the first multicast service.

The first multicast configuration information is for indicating the terminal device to receive the first multicast service. The first multicast configuration information is carried in an RRC message, system information, or a common channel. The first multicast configuration information is multicast configuration information corresponding to the first multicast service. For specific content of multicast configuration information and specific content that is further included in the first multicast configuration information, refer to step 501. Details are not described herein again.

Step 701a: The network device sends second multicast configuration information to the terminal device 1, where the second multicast configuration information corresponds to a second multicast service, the second multicast configuration information includes second indication information, and the second indication information is for indicating that the terminal device 1 does not send feedback information for the second multicast service.

The second multicast configuration information is for indicating the terminal device to receive the second multicast service. The first multicast configuration information is carried in an RRC message. For specific content included in the first multicast configuration information, refer to step 501. Details are not described herein again.

For example, the first multicast service and the second multicast service in step 701 and step 701a are different multicast services. The following separately provides descriptions for two manners.

Manner A: The first multicast configuration information and the second multicast configuration information is carried in different messages. For example, the first multicast configuration information is carried in a first RRC message, and the second multicast configuration information is carried in a second RRC message. The network device separately sends the first RRC message and the second RRC message to the terminal device. The first multicast configuration information in the first RRC message indicates the terminal device 1 to receive the first multicast service, and the second multicast configuration information in the second RRC message indicates the terminal device 2 to receive the second multicast service.

Manner B: The first multicast configuration information and the second multicast configuration information are carried in a same message. For example, the network device sends a third RRC message to the terminal device, where the third RRC message includes the first multicast configuration information and the second multicast configuration information, the first multicast configuration information corresponds to the first multicast service, the second multicast configuration information corresponds to the second multicast service, the first multicast configuration information includes the first indication information, and the second multicast configuration information includes the second indication information.

In at least one embodiment, in step 701 and step 701*a*, the network device indicates, in the first indication information and/or the second indication information by using an explicit indication method or an implicit indication method, whether the terminal device sends the feedback information. For details, refer to the three manners of the first indication information in the foregoing step 501. Details are not described herein again.

The first indication information and the second indication information that are sent by the network device indicate, in a same manner in the foregoing step 501, whether the terminal device 1 provides feedbacks, or indicates, in different manners, whether the terminal device 1 provides feedbacks. This is not limited in this embodiment of this application.

Step 702: The terminal device 1 receives the first multicast configuration information.

Step 702*a*: The terminal device 1 receives the second multicast configuration information.

In step 702 and step 702*a*, that the terminal device 1 receives the first multicast configuration information and the second multicast configuration information that are sent by the network device includes cases shown in the following examples.

In an example, the terminal device 1 receives the first multicast configuration information and the second multicast configuration information from the network device by using a radio resource control (radio resource control, RRC) connection message.

In another example, the terminal device 1 receives the first multicast configuration information and the second multicast configuration information from the network device by using a common channel or system information.

In still another example, the terminal device 1 receives the first multicast configuration information and the second multicast configuration information from the network device in a random access procedure.

Step 703: The network device sends the first multicast service and the second multicast service to the terminal device 1.

The first multicast service and the second multicast service are sent in a same message, or are separately sent.

Step 704: The terminal device 1 receives the first multicast service based on the first multicast configuration information.

In at least one embodiment, in response to the first multicast configuration information further including a G-RNTI 1 associated with the first multicast service in addition to the first indication information, the terminal device 1 describes, based on the G-RNTI 1 in the first RRC message, DCI 1 that is from the network device, and further receive the first multicast service carried on a multicast PDSCH 1, where the DCI 1 is for scheduling the multicast PDSCH 1.

Step 704*a*: The terminal device 1 receives the second multicast service based on the second multicast configuration information.

For step 704 and step 704*a*, the terminal device receives the first multicast configuration information and/or the second multicast configuration information in either of the following manners.

For the manner A in step 701 and step 701*a*: In at least one embodiment, the terminal device 1 descrambles, based on the G-RNTI 1 in the first RRC message, the DCI 1 that is from the network device, and further receive the first multicast service carried on the multicast PDSCH 1, where the DCI 1 is for scheduling the multicast PDSCH 1. In at least one embodiment, the terminal device 1 descrambles, based on a G-RNTI 2 in the second RRC message, DCI 2 that is from the network device, and further receive the second multicast service carried on a multicast PDSCH 2, where the DCI 2 is for scheduling the multicast PDSCH 2.

For the manner B in step 701 and step 701*a*, the terminal device 1 descrambles, based on a G-RNTI in the third RRC message, DCI that is from the network device, and further receive the first multicast service carried on a multicast PDSCH 1 and the second multicast service carried on a multicast PDSCH 2, where the DCI is for scheduling the multicast PDSCH 1 and the multicast PDSCH 2.

Step 705: The terminal device 1 determines, based on the first indication information, whether to provide a feedback for the first multicast service, and determine, based on the second indication information, whether to provide a feedback for the second multicast service. In response to to the answer being yes, the terminal device 1 performs the subsequent step 706. Otherwise, the terminal device 1 stops performing the subsequent step.

Specifically, according to any one or more manners listed in step 505, the terminal device 1 determines, based on the first indication information, whether to provide a feedback for the first multicast service, and determine, based on the second indication information, whether to provide a feedback for the second multicast service. Details are not described herein again.

Step 706: The terminal device 1 sends the first feedback information to the network device, where the first feedback information corresponds to the first multicast service.

The terminal device 1 sends the first feedback information to the network device, where the first feedback information is an ACK or a NACK. For example, in response to the terminal device 1 correctly receiving the first multicast service, the terminal device 1 sends positive feedback information (the ACK) to the network device. In response to the terminal device 1 not correctly receiving the first multicast service, the terminal device 1 sends negative feedback information (the NACK) to the network device.

For example, from a perspective of the network device, the network device determines, based on the received first feedback information corresponding to the first multicast service, a mode (a unicast mode or a multicast mode) for resending the first multicast service. In an example, in response to a quantity of pieces of received NACK feedback information corresponding to the first multicast service being less than or equal to a threshold (where the threshold is a positive integer greater than or equal to 1), the network device resends, in the unicast mode, the first multicast service to a terminal that feeds back the NACK information. Otherwise, the network device resends the first multicast service in the multicast mode. In another example, the network resends the first multicast service in the multicast mode in response to receiving NACK feedback information corresponding to the first multicast service.

In at least one embodiment, where the terminal device sends the first feedback information to the network device, refer to the implementations after step 506. Details are not described herein again.

In at least one embodiment, for a same multicast service, the network device indicates at least one terminal device in a group of terminal devices to provide a feedback for the multicast service, and indicate at least one terminal device in the same group of terminal devices not to provide a feedback for the multicast service. Based on this, the communication method shown in FIG. 7A and FIG. 7B further includes the following step 701*b*, step 703*a*, and step 704*b*. In this embodiment, after receiving the first multicast service, a terminal device 2 does not provide a feedback for the first multicast service.

Step 701*b*: The network device sends third multicast configuration information to the terminal device 2, where the third multicast configuration information corresponds to the multicast service, the third multicast configuration information includes indication information, and the indication information is for indicating that the terminal device 2 does not provides a feedback for the first multicast service.

A first group of terminal devices include the terminal device 1 and the terminal device 2, as shown in FIG. 4A.

Step 703*a*: The network device sends the first multicast service to the terminal device 2.

In at least one embodiment, the network device sends the first multicast service to the terminal device 1 and the terminal device 2 in the first group of terminal devices in the multicast mode.

Step 704*b*: The terminal device 2 receives the first multicast service.

In at least one embodiment, before performing step 701, the network device needs to determine the terminal device that provides a feedback for the multicast service. A determining method used by the network device includes one or more of the following manners.

Manner 1: The network device determines, based on a service requirement of a group of terminal devices to which a terminal device belongs, whether a multicast service sent by the network device to the terminal device is a multicast service that the terminal device is interested in. In response to the answer being yes, the network device determines that the terminal device provides a feedback for the multicast service.

For example, in the foregoing embodiment, a group of terminal devices to which the terminal device 1 belongs is the first group of terminal devices in FIG. 4A. an assumption is made that a service requirement of the first group of terminal devices for the first multicast service is a high reliability requirement. In at least one embodiment, the network device determines that a terminal device that is in the first group of terminal devices and that receives the first multicast service provides a feedback for the first multicast service. The network device configures the terminal device 1 in the first group of terminal devices to provide a feedback for the first multicast service, and configure the terminal device 2 not to provide a feedback for the first multicast service. In at least one embodiment, the network device determines that terminal devices in the first group of terminal devices provide feedbacks for the first multicast service.

For another example, an assumption is made that a service requirement of the first group of terminal devices for the second multicast service is a low reliability requirement. In at least one embodiment, the network device configures the terminal device 1 in the first group of terminal devices not to provide a feedback for the second multicast service.

Manner 2: The network device determines, based on a physical relative distance between a terminal device and the network device, whether the terminal device provides a feedback for a multicast service.

For example, in response to a physical distance between the terminal device 1 and the network device exceeding a specified threshold, the network device indicates that the terminal device 1 provides a feedback for the received first multicast service. On the contrary, in response to a physical distance between the terminal device 2 and the network device not exceeding the specified threshold, the network device indicates that the terminal device 2 does not provide a feedback for the received first multicast service.

Manner 3: The network device determines, based on a channel quality status of a terminal device, whether the terminal device provides a feedback for a multicast service.

For example, the network device determines a channel quality status of the terminal device based on a transmission channel (for example, a PDSCH) of the first multicast service. In response to channel quality of the terminal device 1 being poor, the network device indicates that the terminal device 1 provides a feedback for the received first multicast service. On the contrary, in response to channel quality of the terminal device 2 being good, the network device indicates that the terminal device 2 does not provide a feedback for the received first multicast service.

For another example, the network device determines a channel quality status of the terminal device based on a transmission channel (for example, a PDSCH) of the first multicast service and the second multicast service. In response to transmission channel quality of the terminal device 1 for the first multicast service being poor, the network device indicates that the terminal device 1 provides a feedback for the received first multicast service. In response to transmission channel quality of the terminal device 1 for the second multicast service being good, the network device indicates that the terminal device 1 does not provide a feedback for the received second multicast service.

In at least one embodiment, in step 706, in response to a feedback resource of the first multicast service conflicting with a feedback resource of a unicast service, the terminal device 1 determines, based on a priority of feedback information, whether to send the first feedback information of the first multicast service to the network device. For details, refer to the descriptions in the method shown in FIG. 5. Details are not described herein again.

In at least one embodiment, in Embodiment 1, after step 706 is performed, the method further includes step 707*a*: The terminal device determines to stop providing a feedback for the first multicast service. Implementations in which the terminal device 1 determines to stop sending the feedback information for the first multicast service are separately an implementation 1b and an implementation 2b.

Implementation 1b

The terminal device 1 determines, based on fourth indication information sent by the network device, to stop sending the feedback information for the first service. Correspondingly, step 707*a* includes step 707 and step 708.

Step 707: The network device sends the fourth indication information to the terminal device 1, where the fourth indication information is for indicating the terminal device 1 to stop sending the feedback information for the first multicast service.

For example, the fourth indication information is carried in DCI, an RRC message, or a MAC CE.

Optionally, the method further includes step 708: The terminal device 1 sends feedback stopping acknowledgment information to the network device, where the feedback stopping acknowledgment information is for indicating that the terminal device 1 stops sending the feedback information for the first multicast service. In this way, the terminal device 1 releases a PUCCH resource configured for multicast feedback, so that resource utilization is improved.

Implementation 2b

Step 507*a* is specifically: The terminal device 1 determines, based on a predefined parameter, to stop providing a feedback for the first multicast service. The predefined parameter is a first timer or a first count threshold. For details, refer to the foregoing implementation 2a. Details are not described herein again.

In addition, after the implementation 1b and the implementation 2b, once the terminal device determines to stop sending the feedback information for the first multicast service, the terminal device performs at least one of the following actions: Action 1: Stop sending the feedback information for the first multicast service. Action 2: Release the PUCCH resource configured for multicast feedback, to further improve resource utilization. Action 3: Indicate, to an upper layer, that feedback corresponding to the first multicast service has been stopped. In response to the terminal device is configured with a feedback function and a feedback resource, but the terminal device does not use the feedback resource for a long time, the method is used to avoid a waste of resources, to be specific, to help release the feedback resource in time.

In at least one embodiment, the feedback stopping acknowledgment information in step 708 is carried in a MAC CE. A MAC CE has a corresponding MAC subheader, the MAC subheader includes a logical channel identifier (logical channel identifier, LCID), and the LCID is for identifying a corresponding MAC CE type. For the MAC subheader, refer to FIG. 6A. For two possible implementations that correspond to different MAC CE formats, refer to the manner I and the manner II that are listed after step 508 in Embodiment 1.

In this embodiment of this application, the network device configures different feedback functions and/or feedback resources for different multicast services. In at least one embodiment, the terminal device provides a feedback for the multicast service. In another embodiment, because the first indication information indicates to provide a feedback for the first multicast service, the terminal device provides a feedback for the multicast service that has a high latency requirement and that is indicated by the network device, so that reliability of the multicast service with the high latency requirement is effectively improved.

Embodiment 3

Figure 8:
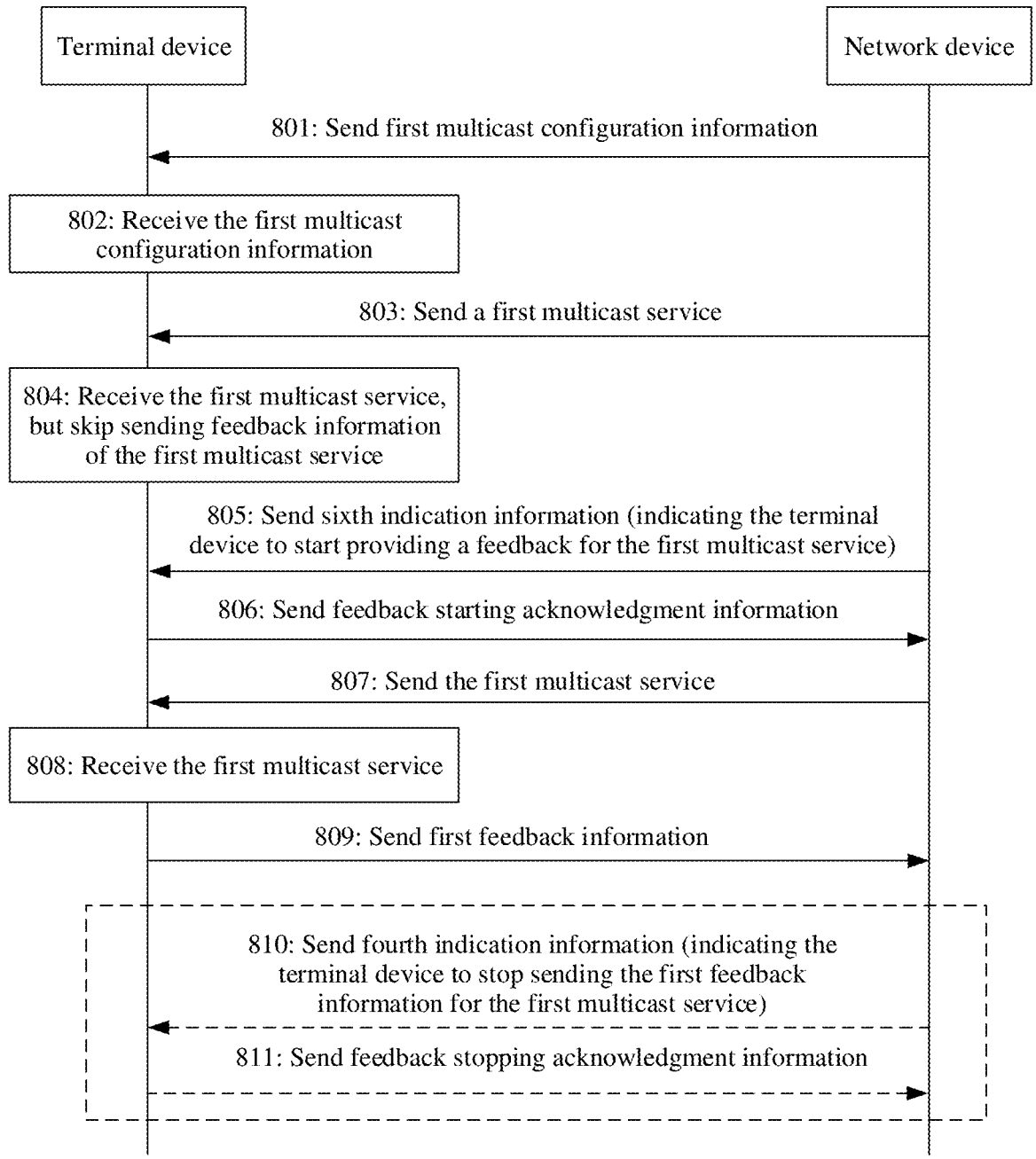

As shown in FIG. 8, a network device dynamically controls, by using indication information, a terminal device to enable or disable a feedback function. A method includes the following steps.

Step 801: The network device sends first multicast configuration information to the terminal device, where the first multicast configuration information corresponds to a first multicast service.

In at least one embodiment, the first multicast configuration information includes configuration information of feedback information corresponding to the first multicast service. For example, the configuration information includes feedback timing duration of first feedback information of the first multicast service, a codebook used for the first feedback information, or a transmission resource for sending the first feedback information.

The first multicast configuration information is for indicating the terminal device to receive the first multicast service. The first multicast configuration information is carried in an RRC message, system information, or a common channel. The first multicast configuration information is multicast configuration information corresponding to the first multicast service. For specific content of multicast configuration information and specific content that is further included in the first multicast configuration information, refer to step 501. Details are not described herein again.

Step 802: The terminal device receives the first multicast configuration information.

In an example, the terminal device receives the first multicast configuration information from the network device through a radio resource control (radio resource control, RRC) connection.

In another example, the terminal device receives the first multicast configuration information from the network device by using the common channel or the system information.

In still another example, the terminal device receives the first multicast configuration information from the network device in a random access procedure.

Step 803: The network device sends the first multicast service to the terminal device.

Step 804: The terminal device receives the first multicast service based on the first multicast configuration information.

In at least one embodiment, in response to the first multicast configuration information further including a G-RNTI 1 associated with the first multicast service in addition to first indication information, the terminal device descrambles, based on the G-RNTI 1 in a first RRC message, DCI 1 that is from the network device, and further receive the first multicast service carried on a multicast PDSCH 1, where the DCI 1 is for scheduling the multicast PDSCH 1.

It is considered by default that the terminal device does not provide a feedback for a received multicast service. Therefore, after performing step 804, the terminal device does not provide a feedback for the currently received first multicast service.

Step 805: The network device sends sixth indication information to the terminal device, where the sixth indication information is for indicating the terminal device to start sending the feedback information for the first multicast service.

For example, the sixth indication information is carried in DCI, an RRC message, or a MAC CE.

Step 806: The terminal device sends feedback starting acknowledgment information to the network device, where the feedback starting acknowledgment information is for indicating that the terminal device starts to send the feedback information for the first multicast service.

The feedback starting acknowledgment information is carried in a MAC CE. a MAC CE has a corresponding MAC subheader, the MAC subheader includes an LCID, and the LCID is for identifying a corresponding MAC CE type. For the MAC subheader, refer to FIG. 6A. There are the following two possible implementations that correspond to different MAC CE formats:

Manner A:

The feedback starting acknowledgment information is indicated by an LCID. For example, in response to the LCID taking a second preset value (for example, a quantity of bytes is 1), the terminal device starts to send the feedback information for the first multicast service.

Manner B:

The feedback starting acknowledgment information is indicated by a length of the MAC CE. For example, in response to the length of the MAC CE being a second preset length, the MAC CE with the second preset length is for indicating that the terminal device starts to send the feedback information for the first multicast service.

Manner C:

The feedback starting acknowledgment information is indicated by indication information in the MAC CE. The indication information is an identifier of the terminal device, an identifier of the first multicast service, or the like.

Step 807: The network device sends the first multicast service to the terminal device.

Step 808: The terminal device continues to receive the first multicast service.

Step 809: The terminal device sends the first feedback information to the network device, where the first feedback information corresponds to the first multicast service.

The first feedback information sent by the terminal device to the network device is positive feedback information (an ACK) or negative feedback information (a NACK). For details, refer to step 506. Details are not described herein again.

Step 810: The network device sends fourth indication information to the terminal device, where the fourth indication information is for indicating the terminal device to stop sending the feedback information for the first multicast service.

For example, the fourth indication information is carried in DCI, an RRC message, or a MAC CE.

Step 811: The terminal device sends feedback stopping acknowledgment information to the network device, where the feedback stopping acknowledgment information is for indicating that the terminal device stops sending the feedback information for the first multicast service.

In this way, after performing step 811, the terminal device no longer provides a feedback for the first multicast service. Therefore, a PUCCH resource configured for multicast feedback is released, and resource utilization is improved. For specific examples, refer to the foregoing implementation 1a and implementation 2a. Details are not described herein again.

In this embodiment of this application, the network device indicates, by using the sixth indication information, the terminal device to enable a feedback function for the first multicast service, and indicate, by using the fourth indication information, the terminal device to stop providing a feedback for the first multicast service, to implement flexible control of the feedback function, and configure the feedback function for the multicast service based on a real-time service requirement. Therefore, service reliability of a communication system is improved, and resource utilization is ensured.

Embodiment 4

Figure 9:
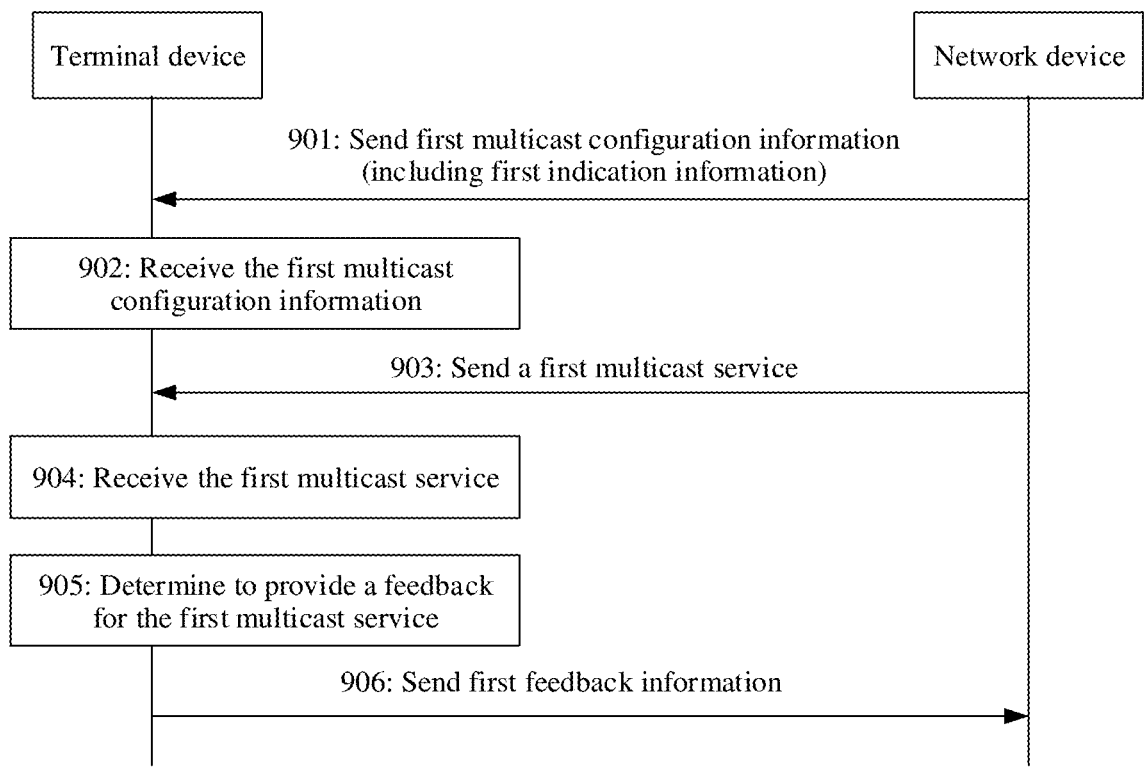

In a scenario, in Embodiment 1, in which the first indication information of the first multicast configuration information is the signal quality parameter threshold, the network device sends the signal quality parameter threshold, so that the terminal device determines, based on transmission quality of the multicast service, whether to send the feedback information. In this embodiment of this application, how a terminal device provides a feedback for a first multicast service in this scenario is further described in detail by using a method flowchart shown in FIG. 9.

Step 901: A network device sends first multicast configuration information to the terminal device, where the first multicast configuration information corresponds to the first multicast service, the first multicast configuration information includes first indication information, the first indication information includes a signal quality parameter threshold corresponding to the first multicast service, and the first indication information is for indicating to send first feedback information for the first multicast service.

The first multicast configuration information is for indicating the terminal device to receive the first multicast service. The first multicast configuration information is carried in an RRC message, system information, or a common channel. The first multicast configuration information is multicast configuration information corresponding to the first multicast service.

In addition, in step 901, the first multicast configuration information alternatively does not include the first indication information, that is, the first indication information (that is, the signal quality parameter threshold) is independently carried in another RRC message, other system information, or another common channel.

For example, a signal quality parameter is RSRP, an SINR, or RSRQ. The signal quality parameter threshold is an RSRP threshold, an SINR threshold, an RSRQ threshold, or the like. For specific content of multicast configuration information and specific content of the first multicast configuration information, refer to step 501 in FIG. 5. Details are not described again in this embodiment of this application.

Step 902: The terminal device receives the first multicast configuration information.

Step 903: The network device sends the first multicast service to the terminal device.

Step 904: The terminal device receives the first multicast service based on the first multicast configuration information.

In at least one embodiment, when the first multicast configuration information further includes a G-RNTI 1 associated with the first multicast service in addition to the first indication information, the terminal device descrambles, based on the G-RNTI 1, DCI 1 that is from the network device, and further receive the first multicast service carried on a multicast PDSCH 1, where the DCI 1 is for scheduling the multicast PDSCH 1.

Step 905: The terminal device compares a value of a signal quality parameter of the first multicast service and the threshold, to determine whether to provide a feedback for the first multicast service. In response to the answer being yes, the terminal device performs the subsequent step 906. Otherwise, the terminal device stops performing the subsequent step.

In response to the value of the signal quality parameter of the first multicast service being less than or equal to the threshold, the terminal device determines that the terminal device provides a feedback for the first multicast service; in response to the value of the signal quality parameter of the first multicast service being greater than the threshold, the terminal device determines that the terminal device does not provides a feedback for the first multicast service.

For example, the terminal device determines, based on at least one or a plurality of the following conditions, that the terminal device provides a feedback for the first multicast service. Condition 1: The terminal device determines that an RSRP value of the first multicast service is less than or equal to the RSRP threshold. Condition 2: The terminal device determines that an RSRQ value of the first multicast service is less than or equal to the RSRQ threshold. Condition 3: The terminal device determines that an SINR value of the first multicast service is less than or equal to the SINR threshold. Condition 4: The terminal device determines that a CQI value of the first multicast service is less than or equal to a CQI threshold. Condition 5: The terminal device determines that an RSSI value of the first multicast service is less than or equal to an RSSI threshold.

Step 906: In response to determining that the terminal device providing a feedback for the first multicast service, the terminal device sends the first feedback information corresponding to the first multicast service to the network device.

The terminal device determines, based on the value of the signal quality parameter of the first multicast service, whether to provide a feedback, and provide a feedback in response to signal quality of the received first multicast service being poor or not good. This effectively provides reliability of the multicast service, and improve resource utilization of a communication system.

Embodiment 5

Figure 10:
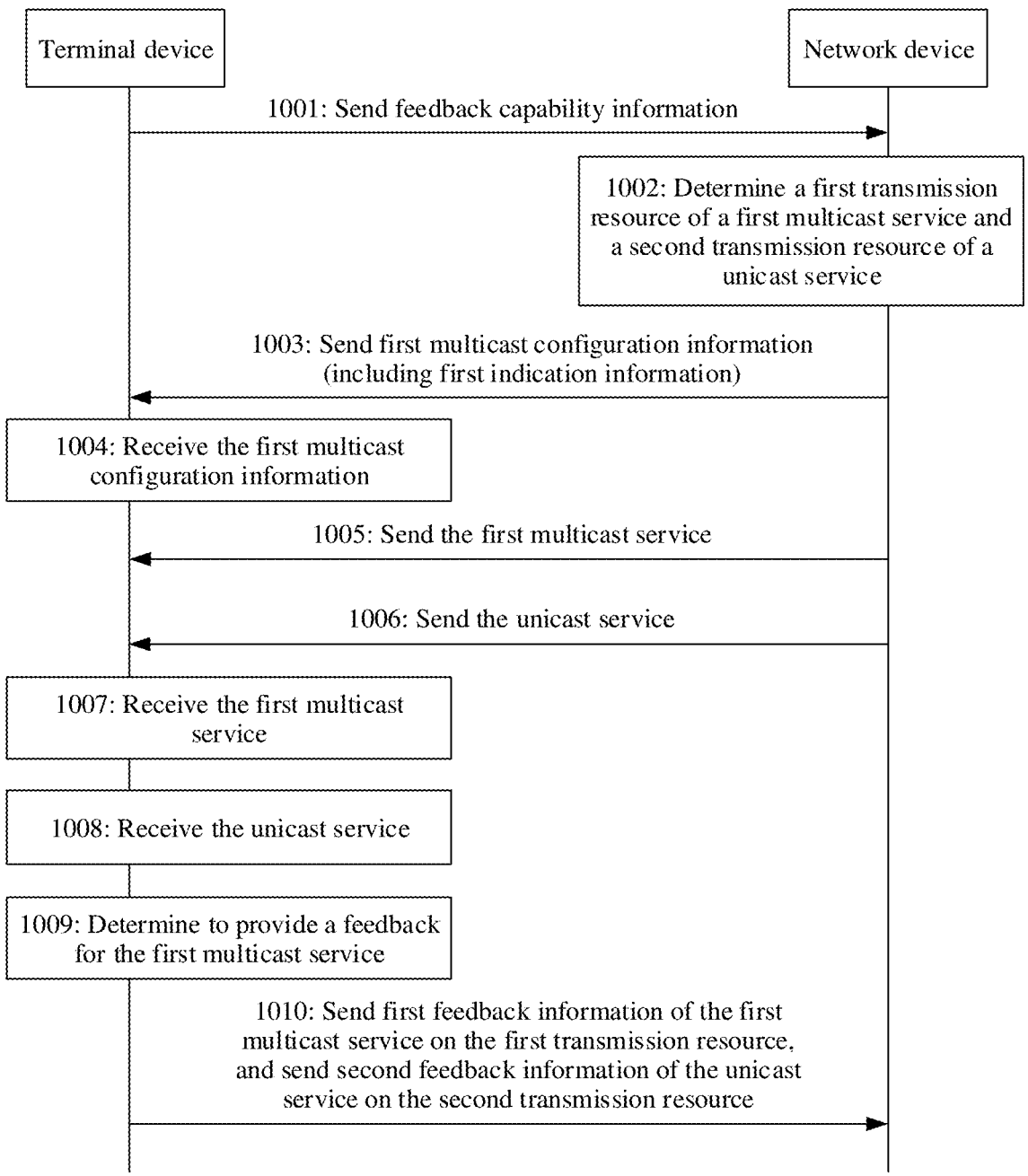

As shown in FIG. 10, according to a communication method provided in this embodiment of this application, a network device indicates feedback functions and/or feedback resources of both a unicast service and a multicast service. The terminal device in FIG. 4A is used as an example. The method includes the following steps.

Step 1001: The terminal device sends feedback capability information to the network device, where the feedback capability information is for indicating a capability of sending unicast feedback information and multicast feedback information on a same feedback resource.

Specifically, the terminal device indicates, in the feedback capability information, that the terminal device does not support simultaneous sending of feedback information of a unicast service and feedback information of a multicast service on a same feedback resource (for example, in a same time sequence).

Step 1002: The network device determines, based on the feedback capability information of the terminal device, a first transmission resource of first feedback information corresponding to a first multicast service of the terminal device and a second transmission resource of feedback information corresponding to a unicast service.

In this embodiment of this application, in response to the feedback capability information indicating that the terminal device does not support providing feedbacks for a unicast service and a multicast service on a same feedback resource, the first transmission resource and the second transmission resource that are configured by the network device do not conflict. For example, the first transmission resource and the second transmission resource are resources in different time sequences.

Step 1003: The network device sends first multicast configuration information to the terminal device, where the first multicast configuration information corresponds to the first multicast service, the first multicast configuration information includes first indication information, and the first indication information is for indicating to send the first feedback information for the first multicast service. The first indication information further indicates the first transmission resource and the second transmission resource.

The first multicast configuration information is for indicating the terminal device to receive the first multicast service. The first multicast configuration information is carried in an RRC message, system information, or a common channel. The first multicast configuration information is multicast configuration information corresponding to the first multicast service. For specific content of multicast configuration information and specific content that is further included in the first multicast configuration information, refer to step 501. Details are not described herein again.

Step 1004: The terminal device receives the first multicast configuration information.

In an example, the terminal device receives the first multicast configuration information from the network device through a radio resource control (radio resource control, RRC) connection.

In another example, the terminal device receives the first multicast configuration information from the network device by using the common channel or the system information.

In still another example, the terminal device receives the first multicast configuration information from the network device in a random access procedure.

Step 1005: The network device sends the multicast service to the terminal device.

Optionally, the method further includes step 1006: The network device sends the unicast service to the terminal device.

Step 1007: The terminal device receives the first multicast service based on the first multicast configuration information.

Optionally, in response to step 1006 being performed, the method further includes step 1008: The terminal device receives the unicast service.

Step 1009: After receiving the first multicast service, the terminal device determines, based on the first indication information, whether to provide a feedback for the first multicast service. In response to the answer being yes, the terminal device performs the subsequent step 1010. Otherwise, the terminal device does not perform step 1010.

The terminal device determines, based on the first indication information by using any one or more manners listed in step 505 in FIG. 5, whether to provide a feedback for the first multicast service. Details are not described herein again.

Step 1010: The terminal device sends the first feedback information of the first multicast service on the first transmission resource, and sends the feedback information of the unicast service on the second transmission resource.

In this embodiment of this application, the terminal device reports, to the network device, a capability indicating whether the terminal device supports sending feedback information of a unicast service and feedback information of a multicast service on a same feedback resource, so that the network device schedules time sequences for the feedback information of the unicast service and the feedback information of the multicast service based on the feedback capability. In this way, a time sequence conflict between feedback of the unicast service and feedback of the multicast service of a same terminal device is avoided.

Embodiment 6

Currently, a radio frame in LTE FDD is divided into 10 subframes (subframe), and s subframe has a length of 1 ms. Different subcarrier spacings correspond to different slot lengths and different relationships between a slot and a subframe in frame structures. For details, refer to the following Table 1:

TABLE 1

Subcarrier spacing, subframe, slot, and quantity of slots per subframe

| Sequence number | Subcarrier spacing SCS Δf (kHz) | Subframe length $T_{subframe}$ (ms) | Time/ Slot $T_s$ (ms) | Quantity of slots per subframe |
|---|---|---|---|---|
| 1 | 2.5/7.5/15 | 1 ms | 0.5 ms | 2 |
| 2 | 1.25 | 1 ms | 1 ms | 1 |
| 3 | 0.37 | 1 ms | 3 ms | 1/3 |

Figure 11A:
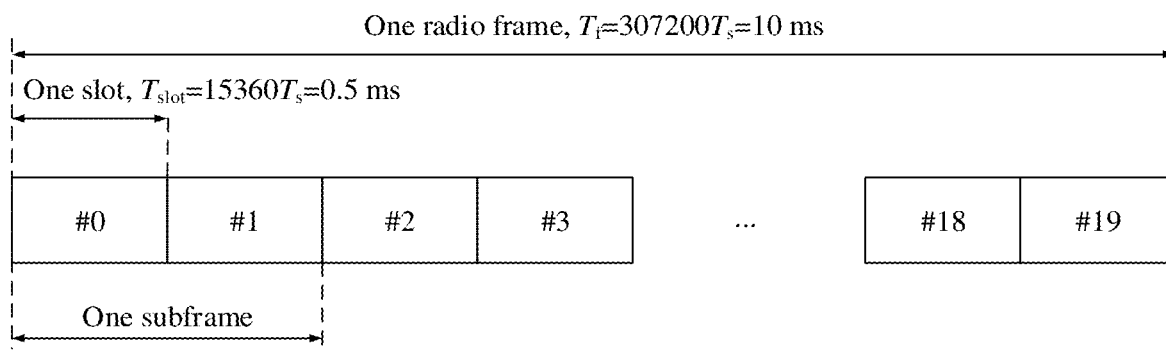
FIG. 11A to FIG. 11D are schematic diagrams of frame structures according to at least one embodiment.

Frame structures corresponding to the three sequence numbers (the sequence number 1, the sequence number 2, and the sequence number 3) in the foregoing table are respectively described as follows:

(1) A frame structure corresponding to Δf={2.5 kHz/7.5 kHz/15 kHz} is shown in FIG. 11A, where one frame is equal to 10 ms, one frame is equal to 10 subframes, and one subframe includes two slots. For 2.5 kHz, a length of a slot is 0.5 ms, and a slot includes one OFDM symbol with a CP.

Figure 11B:
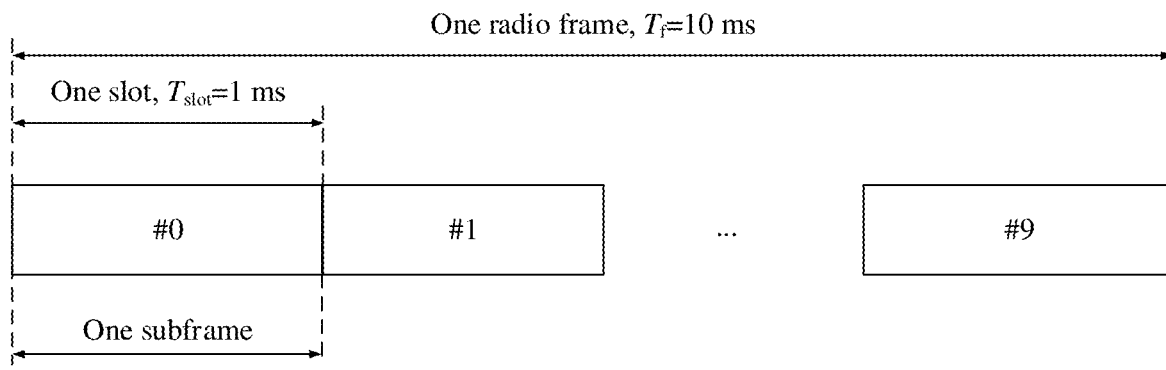

(2) A frame structure corresponding to Δf=1.25 kHz is shown in FIG. 11B, where one frame is equal to 10 ms, one frame is equal to 10 subframes, one subframe is equal to one slot, and one subframe is equal to 1 ms.

Figure 11C:
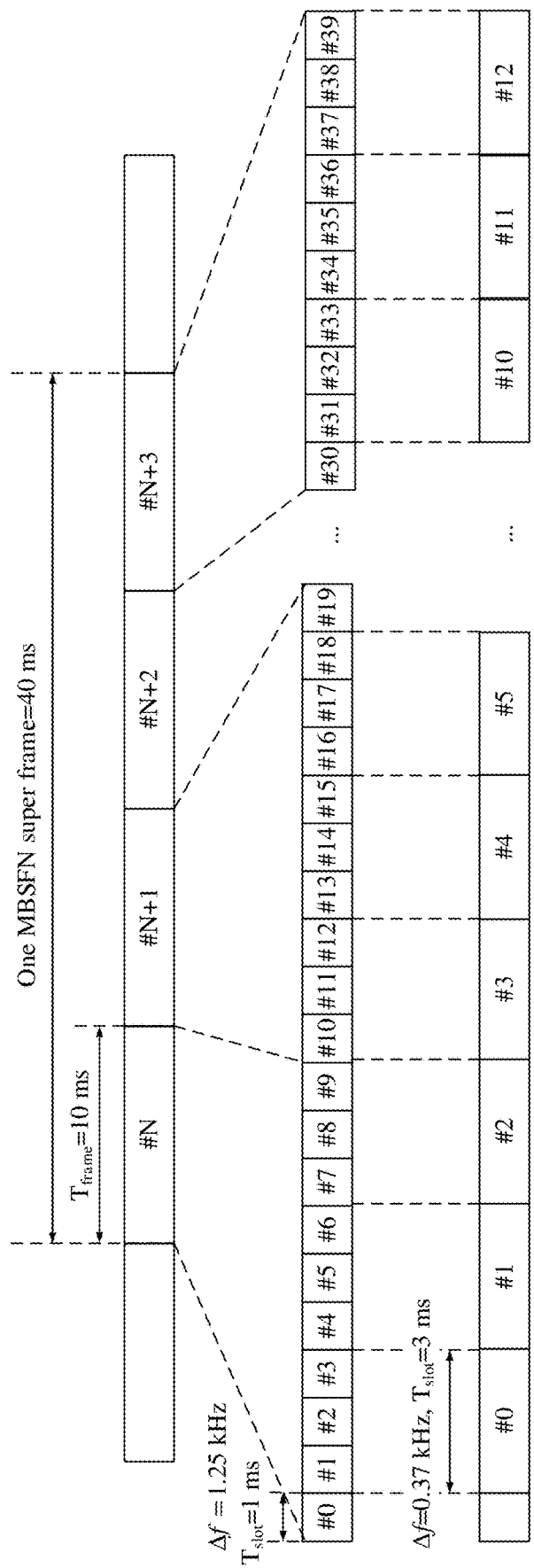

(3) A frame structure corresponding to Δf=0.37 kHz is shown in FIG. 11C, where a time length of a slot is 3 ms, and a slot includes one OFDM symbol with a CP. In a start 40-ms interval that satisfies a condition $n_f$ mod 4=0, there are 13 slots in total, where the 13 slots are numbered in ascending order from 0 to 12, and a position of a slot 0 in the 40-ms interval starts from $30720T_s$. $n_f$ is a radio frame number, and $T_s$ is a basic time unit.

Currently, an existing MBSFN configuration process is as follows: A network device configures, by using an information element (Information Element, IE) multimedia broadcast multicast service network subframe configuration (MBSFN-SubframeConfig), a subframe that is in a network and that is reserved for multimedia broadcast multicast service network (multimedia broadcast multicast service network, MBSFN) in downlink. In the MBSFN-SubframeConfig configuration, the network device configures, by using radioframeAllocationPeriod (radioframeAllocationPeriod) and radioframeAllocationOffset (radioframeAllocationOffset), radio frames in which MBSFN subframes are located, and then indicates, by using subframeAllocation (subframeAllocation) and subframeAllocation-v1430 (subframeAllocation-v1430), specific subframes that are the MBSFN subframes. For detailed configurations, refer to Table 2.

In Table 2:

(1) radioFrameAllocationPeriod and radioFrameAllocationOffset are used to indicate a radio frame position at which an MBSFN subframe appears. In response to a formula SFN mod radioFrameAllocationPeriod=radioFrameAllocationOffset being satisfied, a corresponding radio frame is a radio frame that includes an MBSFN subframe, where SFN (System Frame Number) is a system frame number, n1 corresponds to a value 1, and n2 corresponds to a value 2.

(2) subframeAllocation is used to indicate specific subframes that are allocated as MBSFN subframes in the radio frame that satisfies the constraint formula of radioFrameAllocationPeriod and radioFrameAllocationOffset in (1).

(3) fourFrames: A string of bits are used to indicate a position of an MBSFN subframe in four consecutive radio frames. In response to a bit being set to "1", a corresponding subframe is allocated for MBSFN. For FDD, subframes #1, #2, #3, #6, #7, and #8 are allocated for MBSFN.

(4) fourFrames-v1430: A string of bits are used to indicate a position of an MBSFN subframe in four consecutive radio frames. For FDD, subframes #4 and #9 may also be configured as MBSFN subframes.

A problem existing in a current technology is: In a current MBSFN multicast mode, configuration is performed on a per-subframe (1 ms) basis (to be specific, specific subframes that are used for an MBMS are indicated by using signaling). However, if the frame structure, shown in FIG. 11C, corresponding to Δf=0.37 kHz is introduced, a minimum unit that is identified by a terminal device is one slot=3 ms, so that uncertainty exists when the terminal device configured with Δf=0.37 kHz determines a specific time domain position at which a resource that is used for an MBMS is located.

This embodiment of this application provides a communication method. The method includes: For a terminal device (where Δf=1.25/2.5/7.5/15 kHz), the terminal device determines, based on MBSFN-SubframeConfig sent by a network device, specific subframes in time domain that are reserved by the network device for a downlink MBSFN service. However, in response to the terminal device being further configured with a subcarrier spacing Δf=0.37 kHz, that is, a corresponding minimum time unit is a slot=3 ms, in response to the terminal device determining specific time domain positions that are reserved by the base station for MBSFN in downlink, a determining method is different from an existing determining method.

Specifically, the terminal device is configured with a subcarrier spacing with a specific value, and the terminal device determines whether a minimum time unit corre-

TABLE 2

```
-- ASN1START
MBSFN-SubframeConfig ::=          SEQUENCE {
    radioframeAllocationPeriod        ENUMERATED {n1, n2, n4, n8, n16, n32},
    radioframeAllocationOffset        INTEGER (0..7),
    subframeAllocation                CHOICE {
        oneFrame                          BIT STRING (SIZE(6)),
        fourFrames                        BIT STRING (SIZE(24))
    }
}
MBSFN-SubframeConfig-v1430 ::=    SEQUENCE {
    subframeAllocation-v1430          CHOICE {
        oneFrame-v1430                    BIT STRING (SIZE(2)),
        fourFrames-v1430                  BIT STRING (SIZE(8))
    }
}
-- ASN1STOP
``` sponding to the subcarrier spacing is valid for MBSFN. A method for determining a valid minimum time unit includes: in response to an MBSFN subframe completely matching a minimum time unit corresponding to a subcarrier spacing with a specific value in time domain, or u subframes corresponding to a minimum time unit corresponding to a subcarrier spacing with a specific value are used by the network device for MBSFN in downlink, the terminal device receives, in such a slot, an MBMS sent by the network device. For example, in response to Δf=0.37 kHz, a quantity u of subframes corresponding to the minimum time unit is 3.

For example, the network device sends an MBSFN service in a slot corresponding to Δf=0.37 kHz in response to MBSFN subframes matching the corresponding slot in time domain (that is, the MBSFN subframes and the slot overlap in time domain). For the terminal device configured with Δf=0.37 kHz, only in response to subframes corresponding to a slot being configured by the network device for MBSFN in downlink, the terminal device receives, in such a slot, an MBMS sent by the network device.

Figure 11D:
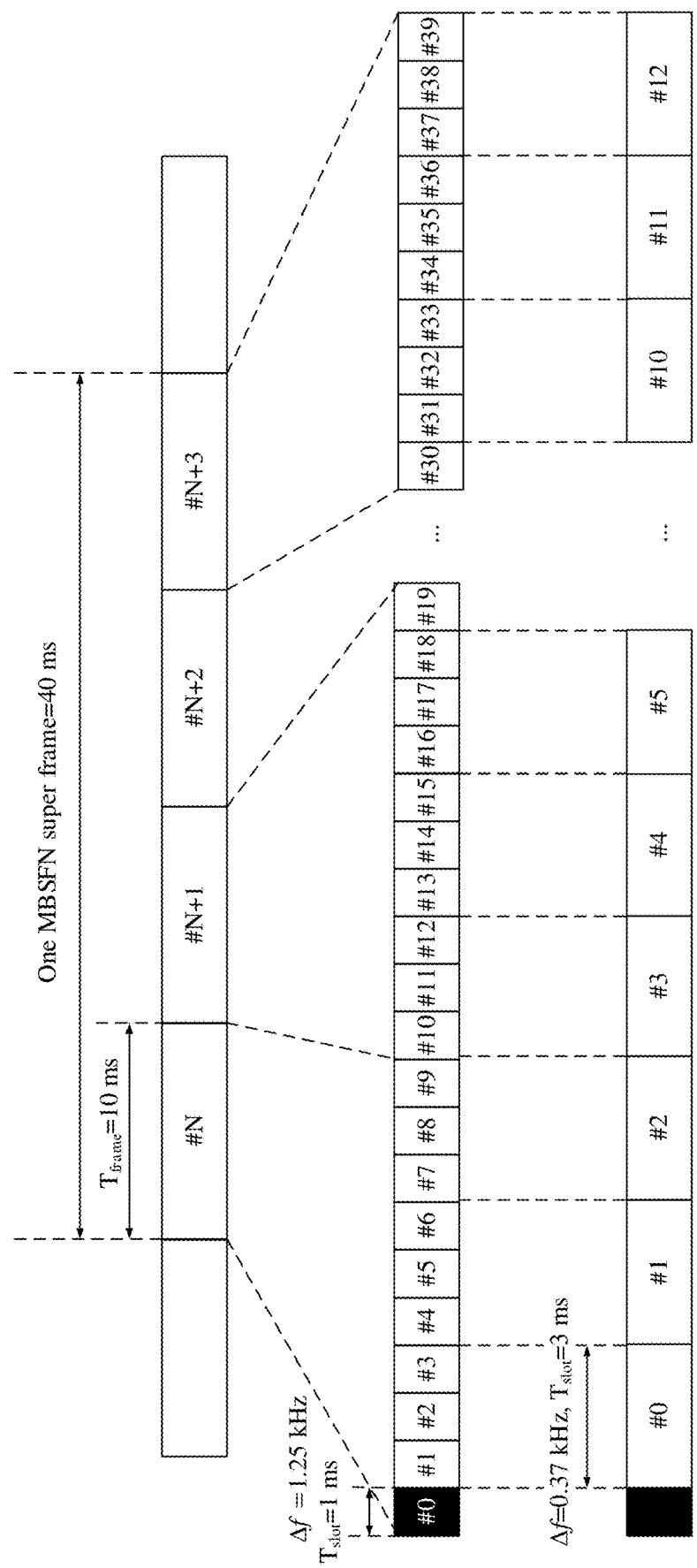

For example, as shown in FIG. 11D, the network device configures a subframe #1, a subframe #2, a subframe #3, a subframe #6, a subframe #7, and a subframe #8 as reserved subframes for MBSFN. However, for the terminal device configured with Δf=0.37 kHz (that is, for a frame structure corresponding to the last row), a beginning part (a black filled part) is a position used to send master system information and cannot be changed. Therefore, for UE configured with Δf=0.37 kHz, the subframes #1, #2, and #3 corresponding to a slot #0 are reserved by the network device for MBSFN in downlink, so that the slot #0 satisfies a condition, and the terminal device receives, in the slot #0, an MBMS sent by the base station. For a slot #1, because only the corresponding subframe #6 is an MBSFN subframe, but both a subframe #4 and a subframe #5 are non-MBSFN subframes, the terminal device does not receive, in the slot #1, an MBMS sent by the network device. Similarly, for a slot #2, the subframes #7 and #8 corresponding to the slot #2 are MBSFN subframes, but a subframe #9 is a non-MBSFN subframe. Therefore, for the terminal device configured with Δf=0.37 kHz, the slot #2 is not reserved by the network device for MBSFN in downlink.

In this embodiment of this application, the terminal device determines an MBMS receiving position according to the foregoing method, so that the terminal device configured with Δf=0.37 kHz accurately determines a time domain resource corresponding to MBSFN in downlink.

A communication method corresponding to FIG. 11D is implemented based on any possible implementation of Embodiment 1 to Embodiment 5.

Embodiment 7

Based on the method for determining a valid slot in Embodiment 6, for a new feature introduced in R14 in the standard, that is, a carrier dedicated to an MBMS (which is also referred to as a dedicated MBMS carrier, dedicated MBMS carrier), this embodiment of this application provides another communication method based on this feature.

Figure 12A:
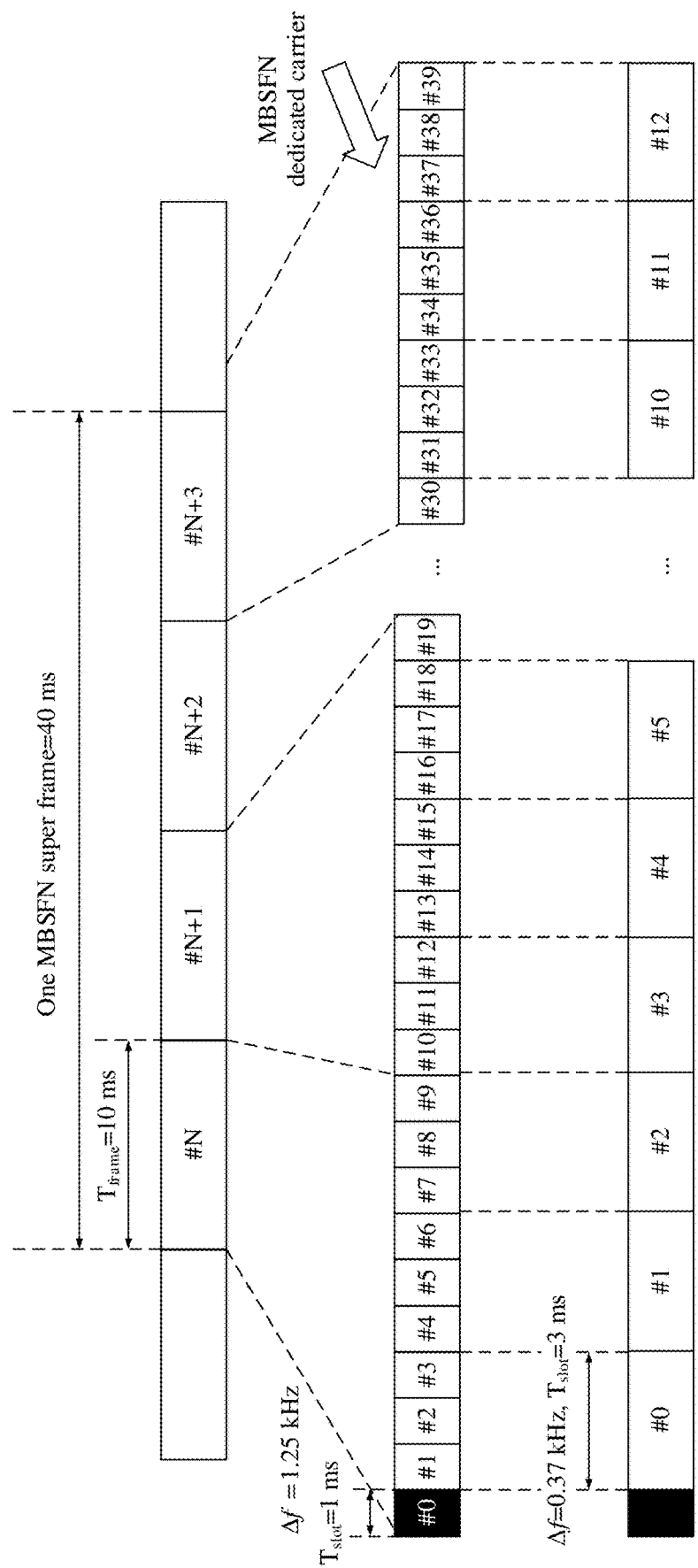
FIG. 12A to FIG. 12G are schematic diagrams of other frame structures and mapping patterns according to at least one embodiment.

In this embodiment of this application, a dedicated frequency domain carrier is used to send an MBMS, but specific time domain positions that cannot be used to send the MBMS is indicated. FIG. 12A is a schematic diagram of a structure of a radio frame after the dedicated MBMS carrier is introduced. There is at least one non-MBSFN (non-MBSFN) subframe in every 40 ms, and the non-MBSFN subframe is used to send a PSS/SSS/CRS/PBCH/PDCCH and a PDSCH for sending system information.

A broadcast message (a master system information block) is used to indicate a quantity of additional non-MBSFN subframes after a non-MBSFN subframe #0. Optionally, the quantity of additional non-MBSFN subframes after the non-MBSFN subframe #0 is 0, 1, 2, or 3, and a position of the additional non-MBSFN subframe is further indicated in a system information block 1 (SIB 1). A specific indication is configured by using a NonMBSFN-SubframeConfig-r14 (NonMBSFN-SubframeConfig-r14) field in the SIB 1, as shown in Table 3.

TABLE 3

| NonMBSFN-SubframeConfig-r14 ::= | SEQUENCE { |
|---|---|
| radioFrameAllocationPeriod-r14 | ENUMERATED {rf4, rf8, rf16, rf32, rf64, rf128, rf512}, |
| radioFrameAllocationOffset-r14 | INTEGER (0..7), |
| subframeAllocation-r14 | BIT STRING (SIZE(9)) |
| } | | radioFrameAllocationPeriod (radioFrameAllocationPeriod) and radioFrameAllocationOffset (radioFrameAllocationOffset) in the foregoing field are two parameters that are used to calculate a position of a radio frame in which a non-MBSFN subframe is located. The position of the radio frame (indicated by an SFN) including the non-MBSFN subframe satisfies the following formula:

SFN mod radioFrameAllocationPeriod=radioFrameAllocationOffset.

SubframeAllocation is used to indicate a position of the non-MBSFN subframe in the radio frame that satisfies the foregoing formula. SubframeAllocation occupies nine bits, and a bit 1 to a bit 9 in the nine bits respectively correspond to a subframe 1 to a subframe 9. In response to a value of a bit being "0", a corresponding subframe is an MBSFN subframe. In response to a value of a bit being "1", a corresponding subframe is a non-MBSFN subframe.

As shown in FIG. 12A, a base station configures an MBSFN dedicated carrier, only a subframe #0 is configured as a non-MBSFN subframe, and there is no additional non-MBSFN subframe after the subframe #0. Therefore, for UE configured with Δf=0.37 kHz (that is, for a frame structure corresponding to the last row), a black part is a position used to send master system information and cannot be changed. In this case, for the UE configured with Δf=0.37 kHz, subframes #1, #2, and #3 corresponding to a slot #0 are reserved by the base station for MBSFN in downlink, so that the slot #0 satisfies a condition. Similarly, subframes corresponding to a slot #1 to a slot #12 are also reserved by the base station for a downlink MBMS, so that the slot #1 to the slot #12 also satisfy the condition.

Figure 12B:
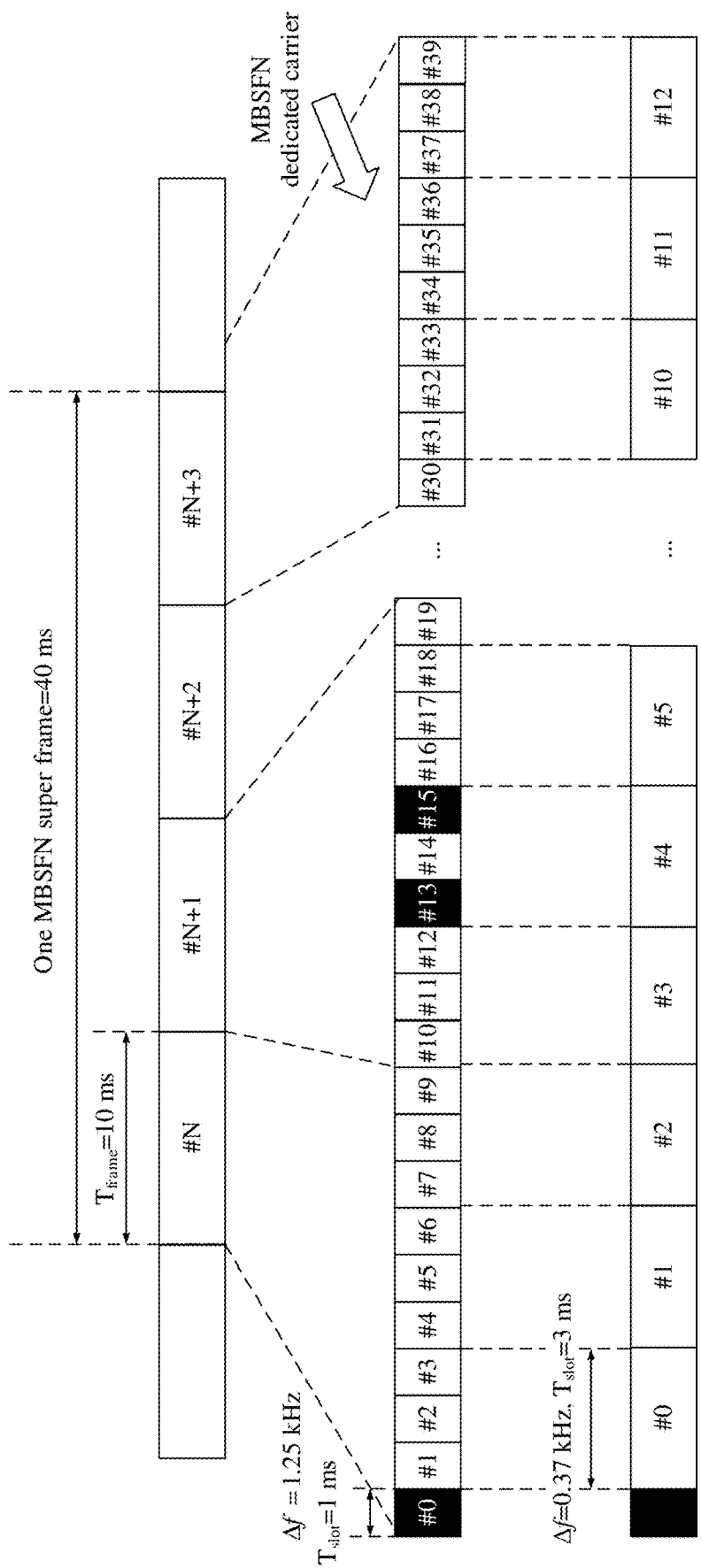

As shown in FIG. 12B, a base station configures an MBMS dedicated carrier, configures a subframe #0 as a non-MBSFN subframe, and configures that there is an additional non-MBSFN subframe after the subframe #0 (where for example, a value of radioFrameAllocationperiod is configured as rf4, a value of radioFrameAllocationOffset is configured as 2, and a bit string configured for subframeAllocation is 001010000). As described herein, the foregoing configuration parameters and with reference to the foregoing figure, the base station configures non-MBSFN subframes in a radio frame #N+1, and configures subframes #13 and #15 in the radio frame #N+1 as non-MBSFN subframes.

Therefore, for UE configured with Δf=0.37 kHz (that is, for a frame structure corresponding to the last row), for a slot

6, because the subframes #13 and #15 corresponding to the slot #6 are configured as non-MBSFN subframes, the slot #6 does not satisfy a condition for valid slots, that is, the slot #6 is invalid for an MBMS. A method for determining whether another slot is valid is the same as that described above, and details are not described herein again.

In addition, after Δf=0.37 kHz is introduced, the following changes are brought:

For a codeword q, a bit block $b^{(q)}(0), \ldots, b^{(q)}(M_{bit}^{(q)}-1)$ (where $M_{bit}^{(q)}$ identifies a quantity of bits in the codeword q transmitted on a physical channel in a subframe/slot/sub-slot) is scrambled according to the following formula before modulation to generate a scrambled bit block $\tilde{b}^{(q)}(0), \ldots, \tilde{b}^{(q)}(M_{bit}^{(q)}-1)$:

$$\tilde{b}^{(q)}(i)=(b^{(q)}(i)+c^{(q)}(i)) \bmod 2.$$

The scrambling sequence $c^{(q)}(i)$ is used to initialize a scrambling code sequence generator at a start moment of a subframe or slot, and an initialization value $c_{init}$ is determined based on a specific transmission channel type:

$$c_{init} = \begin{cases} n_{RNTI} \cdot 2^{14} + q \cdot 2^{13} + \lfloor n_s/2 \rfloor \cdot 2^9 + N_{ID}^{cell} & \text{for PDSCH} \\ \lfloor n_s/2 \rfloor \cdot 2^9 + N_{ID}^{MBSFN} & \text{for PMCH} \end{cases}.$$

$n_{RNTI}$ corresponds to an RNTI related to PDSCH transmission.

In addition, as described above, different subcarrier spacings correspond to different slot sizes. For example, a slot size corresponding to Δf=1.25/2.5/7.5/15 kHz is 1 ms, and a slot size corresponding to Δf=0.37 kHz is 3 ms. Therefore, in the foregoing formula, to avoid slot ambiguity, slot granularities used for determining slot numbers under different subcarrier spacings is described in a protocol: (1) In response to a subcarrier spacing being 0.37 kHz, slot numbers are determined at a slot granularity of 3 ms. In a start 40-ms interval that satisfies a condition $n_f \bmod 4=0$, there are 13 slots in total, where the 13 slots are numbered in ascending order from 0 to 12, and a position of a slot 0 in the 40-ms interval starts from $30720T_s$. $n_f$ is a radio frame number, and $T_s$ is a basic time unit.

(2) In response to a subcarrier spacing being 1.25 kHz, numbering is performed at a slot granularity of 1 ms. (3) In response to a subcarrier spacing being 2.5/7.5/15 kHz, numbering is performed at a slot granularity of 0.5 ms.

Figure 12C:
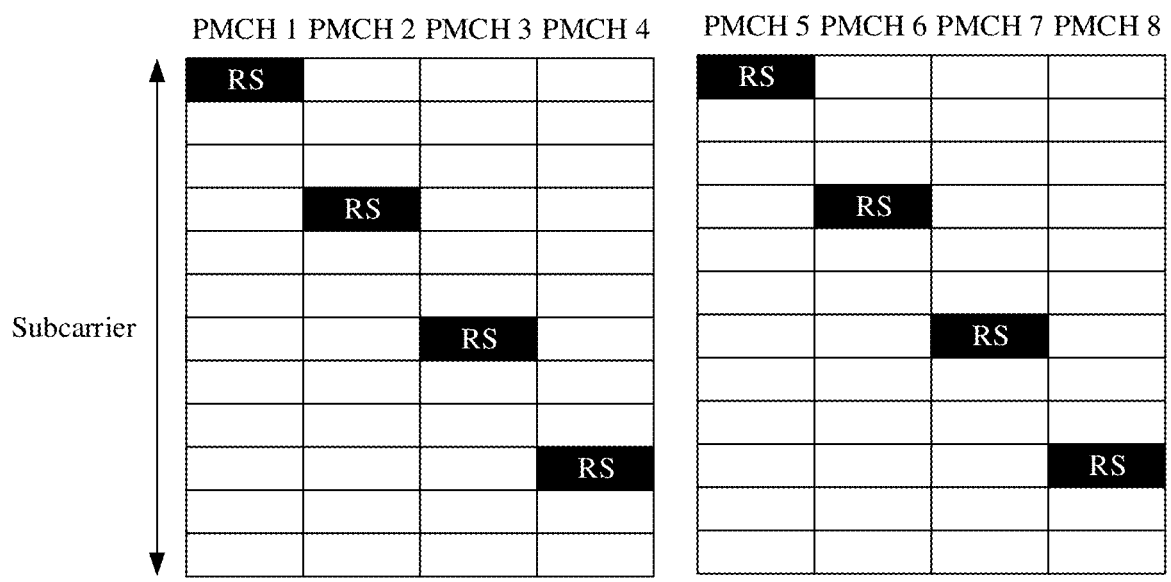
Figure 12D:
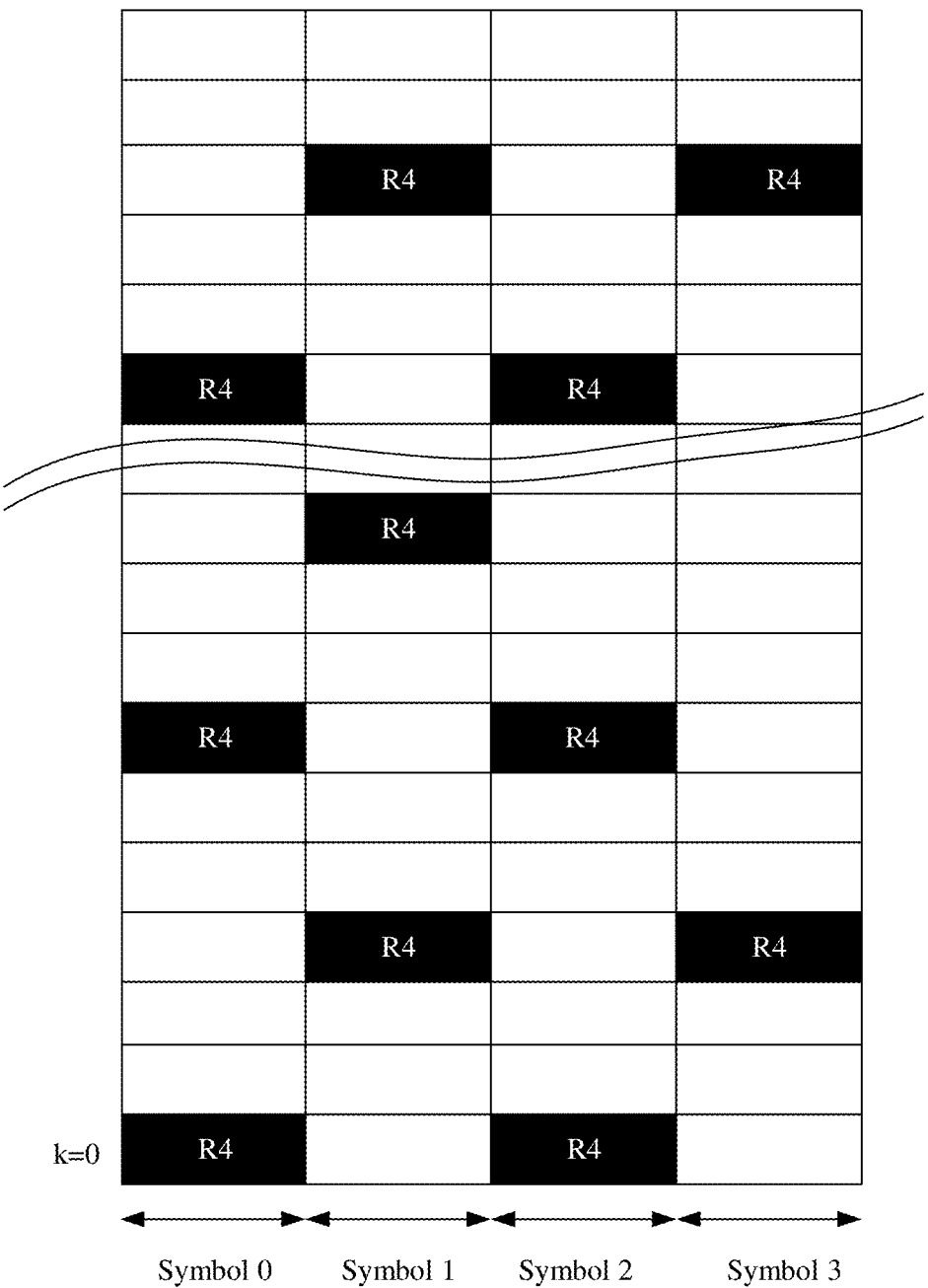

In addition, in response to the subcarrier spacing being 0.37 kHz, there are two reference signal (reference signal, RS) mapping patterns (pattern). One pattern (pattern) corresponds to a periodicity of two symbols (symbol), and the other pattern (pattern) corresponds to a periodicity of four symbols. The two reference signal mapping patterns are shown in FIG. 12C and FIG. 12D.

Figure 12E:
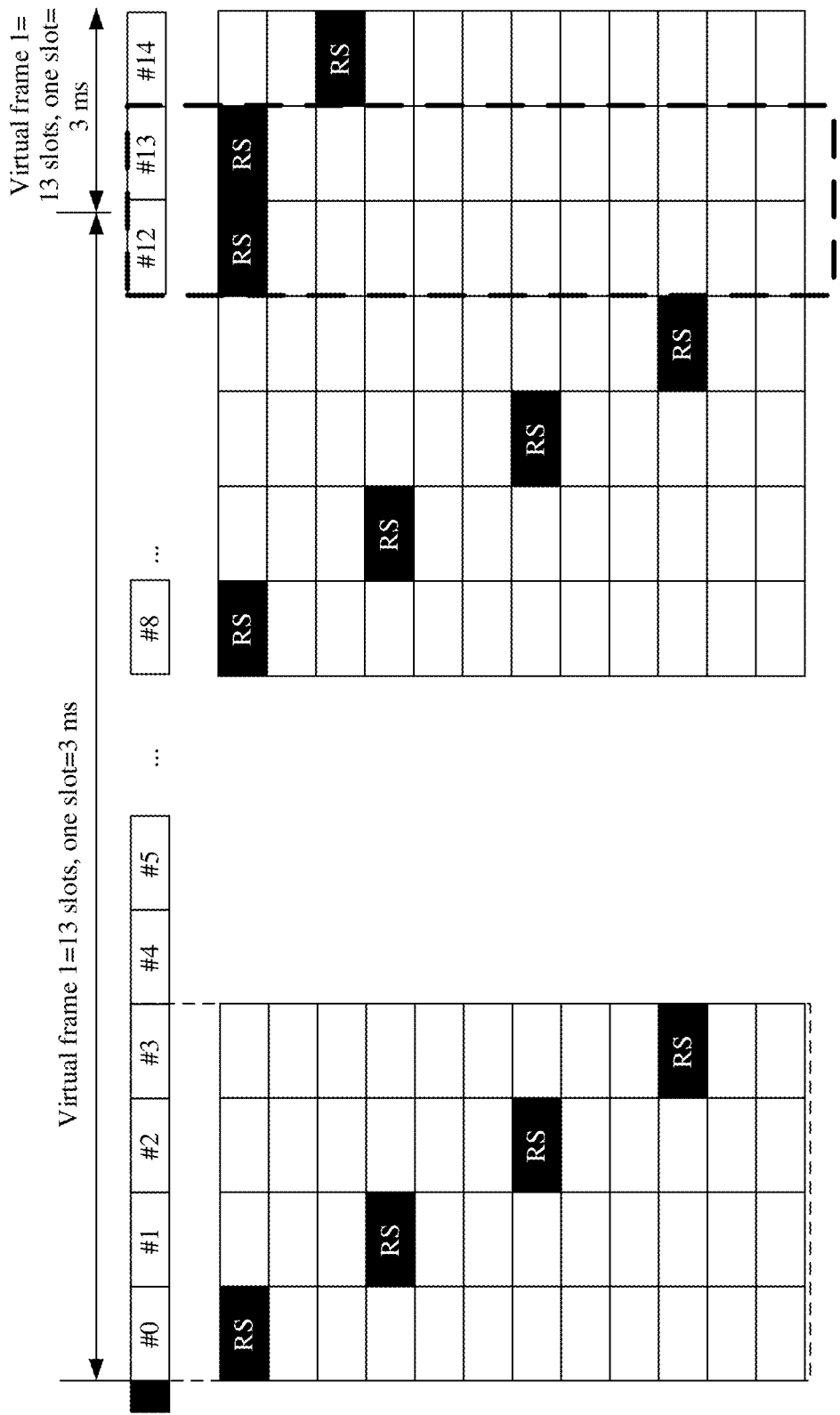
Figure 12F:
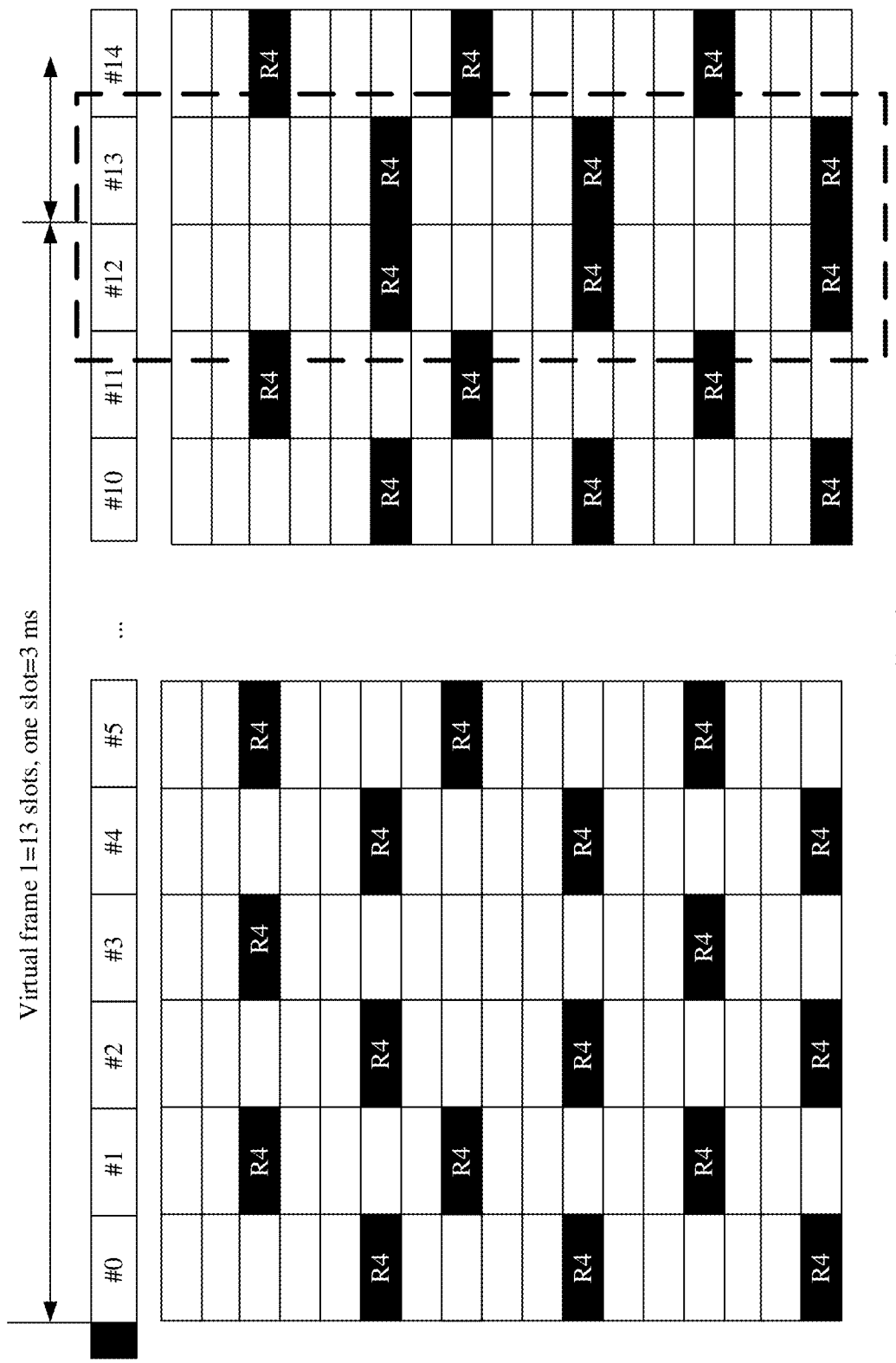

In addition, in response to the subcarrier spacing being 0.37 kHz, a symbol is equivalent to a slot. Therefore, in response to slot numbers being periodically repeated from 0 to 12 (where there are 13 slots in total) in response to the subcarrier spacing being 0.37 kHz, because 13 is neither a multiple of 2 nor a multiple of 4, a problem of misalignment exists in the reference signal mapping pattern. Corresponding problem descriptions are shown in FIG. 12E and FIG. 12F. As identified in FIG. 12E and FIG. 12F, two adjacent slots #12 and #13 correspond to a same RS pattern, that is, a problem of misalignment exists.

Based on the foregoing problem, this embodiment of this application provides the communication method. A virtual frame is introduced in the method. In the virtual frame, numbering is performed by using 52 slots as a group, that is, slot numbers are 0 to 51. The following figure shows a virtual frame structure corresponding to the subcarrier spacing of 0.37 kHz. A length of one virtual frame is 16*10 ms=160 ms. One virtual frame includes four frames with a length of 40 ms. A 40-ms frame includes two parts: The first millisecond in every 40 ms is used to send content such as a broadcast message and is not used for slot numbering. 39 milliseconds starting from the second millisecond to the $40^{th}$ millisecond are numbered by classifying three milliseconds as one slot. One virtual frame includes 52 slots, so that slot numbers are a slot #0 to a slot #51. In response to a next virtual frame being entered, slot numbers start from the slot #0 again.

Figure 12G:
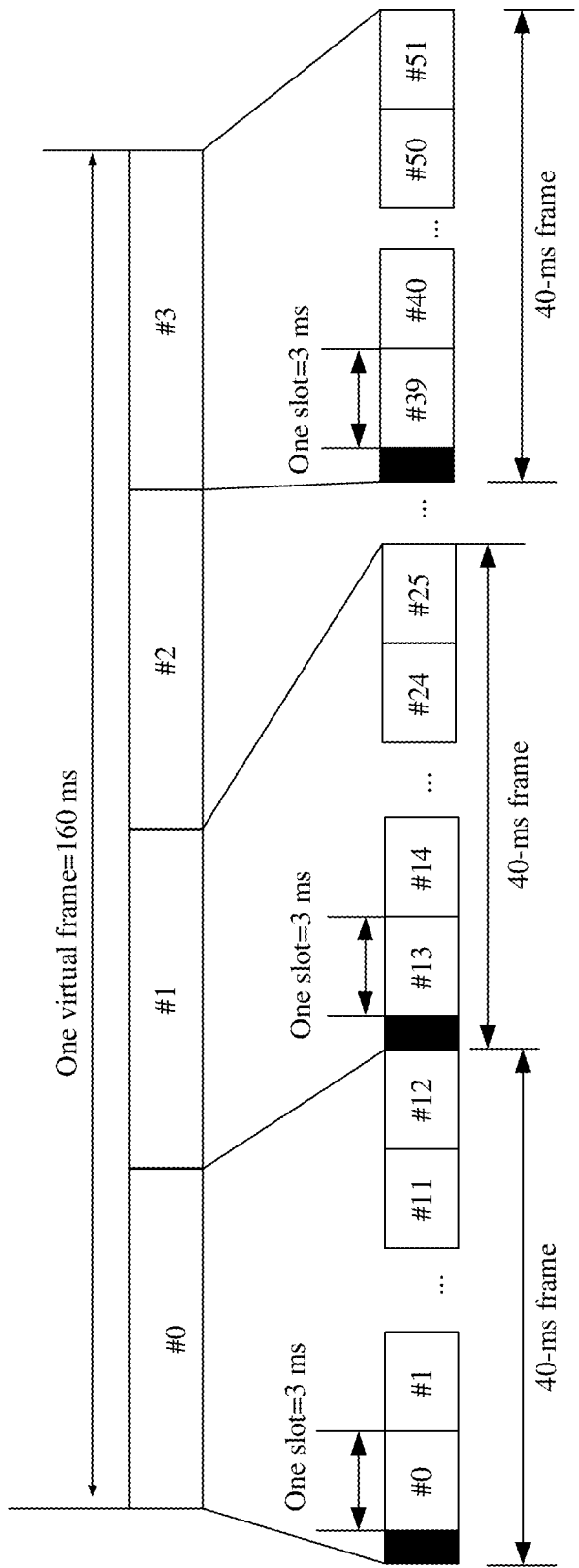

As shown in FIG. 12G, for a 40-ms frame numbered #0 (a black part), the first millisecond (a black part) is used to send content such as a broadcast message, and the remaining 39 milliseconds are numbered by classifying three milliseconds as one slot and correspond to a slot #0 to a slot #12. In a 40-ms frame numbered #1, the first millisecond is not used for slot numbering, and slot numbering is performed starting from the second millisecond by using numbers after the slot #12, that is, using numbers starting from a slot #13. By analogy, for a 40-ms frame numbered #3, corresponding slot numbers are from a slot #39 to a slot #51.

Resource unit mapping under the subcarrier spacing of 0.37 kHz is described as follows: A reference signal sequence $r_l(m')$ in an OFDM symbol l is mapped to a complex modulation symbol $a_{k,l}^{(p)}$ according to the following relationship:

$$a_{k,l}^{(p)}=r_{l,n_s}(m').$$

p=4, $n_s$ is a number of a 3-ms slot, and $$0 \leq k < \frac{N_{sc}^{RB}}{12} N_{RB}^{DL}.$$

For an MBSFN reference signal pattern type 1:

$$k = \begin{cases} 12\left(m' - \left\lfloor \frac{N_{sc}^{RB}}{12}\right\rfloor \Delta\right) + 3(n_s \bmod 4) & \text{in response to } n_s \bmod 4 \in \{0, 1\} \\ 12\left(m' - \left\lceil \frac{N_{sc}^{RB}}{12}\right\rceil \Delta\right) + 3(n_s \bmod 4) & \text{in response to } n_s \bmod 4 \in \{2, 3\} \end{cases},$$

$$l = 0,$$

$$\Delta = \frac{N_{RB}^{max,DL} - N_{RB}^{DL}}{2},$$

and $$m' = 0, 1, \ldots, \frac{N_{sc}^{RB}}{12} N_{RB}^{max,DL} - 1.$$

For an MBSFN reference signal pattern type 2:

$$k = 6\left(m' - \frac{N_{sc}^{RB}}{6}\Delta\right) + 3(n_s \bmod 2),$$

$$l = 0,$$

$$\Delta = \frac{N_{RB}^{max,DL} - N_{RB}^{DL}}{2},$$

and $$m' = 0, 1, \ldots, \frac{N_{sc}^{RB}}{6} N_{RB}^{max,DL} - 1.$$

In the foregoing formulas, $n_s$ is replaced by $n_s'$, and $n_s'$ is expressed as follows:

$$n_s'=[f(n_f/4)*13+n_s] \bmod 52, \text{ or } n_s'=f(n_f/4)*13+n_s.$$

f( ) is a floor function, and a function of f( ) is "rounding down", that is, to obtain a maximum integer not greater than x. Different from "rounding off", rounding down is to directly obtain a value that is on the left of and that is closest to a required value on a number axis, that is, a maximum integer not greater than the required value. of is a value of a frame number of a radio frame, $n_s$ is a number of a 3-ms slot, and the number ranges from 0 to 12 in 40 ms. Specifically, in a start 40-ms interval that satisfies the condition $n_f \bmod 4=0$, there are 13 slots in total, where the 13 slots are numbered in ascending order from 0 to 12, and a position of a slot 0 in the 40-ms interval starts from $30720T_s$. $n_f$ is a radio frame number, and $T_s$ is a basic time unit.

In this embodiment of this application, according to the foregoing method, a terminal device can determine, in different carrier spacing configurations, a time-frequency position at which a network device sends a multicast service, to ensure that the terminal device accurately receives the multicast service.

For Embodiment 1 to Embodiment 7:

(1) Embodiment 1 and Embodiment 7 are separately implemented in different scenarios, or are implemented in combination in a same scenario, or different solutions involved in different embodiments are implemented in combination (where for example, some or all solutions involved in Embodiment 1 are implemented in combination with Embodiment 6). This is not specifically limited.

(2) Step numbers in the flowcharts (for example, FIG. 5, FIG. 7A and FIG. 7B, FIG. 8, FIG. 9, and FIG. 10) described in embodiments of this application are merely examples of execution procedures, and do not constitute a limitation on execution sequences of the steps. In embodiments of this application, there is no strict execution sequence between steps that have no time sequence dependency relationship.

The foregoing mainly describes the solutions provided in embodiments of this application from a perspective of interaction between a network device and a terminal device. To implement the foregoing functions, the network device or the terminal device includes a corresponding hardware structure and/or a software module for performing a function. A person skilled in the art is aware that, in combination with units and algorithm steps of the examples described in embodiments disclosed herein, embodiments are implemented by hardware or a combination of hardware and computer software. Whether a function is performed by hardware or hardware driven by computer software depends on particular applications and design constraints of the technical solutions. A person skilled in the art is able to use different methods to implement the described functions for a particular application, but understands that the described functions are implemented according to embodiment described herein.

Figure 13:
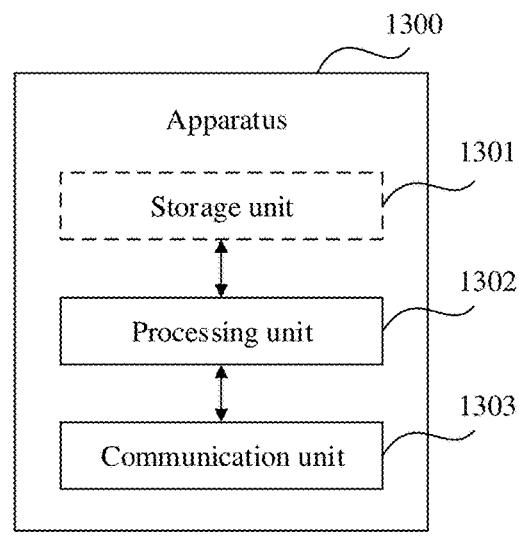
FIG. 13 is a possible example block diagram of an apparatus according to at least one embodiment.

In embodiments of this application, division into function units is performed on the terminal device and the network device based on the foregoing method examples. For example, division into a function unit is based on a corresponding function, or two or more functions are integrated into one unit. The integrated unit is implemented in a form of hardware, or is implemented in a form of a software function unit.

in response to an integrated unit being used, FIG. 13 is an example block diagram of an apparatus according to at least one embodiment. As shown in FIG. 13, the apparatus 1300 includes a processing unit 1302 and a communication unit 1303. The processing unit 1302 is configured to control and manage an action of the apparatus 1300. The communication unit 1303 is configured to support the apparatus 1300 in communicating with another device. Optionally, the communication unit 1303 is also referred to as a transceiver unit, and includes a receiving unit and/or a sending unit, respectively configured to perform a receiving operation and a sending operation. The apparatus 1300 further includes a storage unit 1301, configured to store program code and/or data of the apparatus 1300.

The apparatus 1300 is the terminal device in any one of the foregoing embodiments, or is a chip disposed in the terminal device. The processing unit 1302 supports the apparatus 1300 in performing actions of the terminal device in the foregoing method examples. Alternatively, the processing unit 1302 mainly performs an internal action of the terminal device in the method examples, and the communication unit 1303 supports communication between the apparatus 1300 and a network device. For example, the communication unit 1303 is configured to perform step 502, step 504, step 506, and step 508 in FIG. 5; step 702, step 702a, step 704, step 704a, and step 708 in FIG. 7A and FIG. 7B; step 802, step 804, step 806, step 808, step 809, and step 811 in FIG. 8; step 902, step 904, and step 906 in FIG. 9; and step 1001, step 1004, step 1007, step 1008, and step 1010 in FIG. 10. The processing unit 1302 is configured to perform step 505 in FIG. 5, step 705 in FIG. 7A, step 905 in FIG. 9, and step 1009 in FIG. 10.

In at least one embodiment, the first multicast configuration information further includes a group radio network temporary identifier G-RNTI and/or a multicast service identifier that are/is associated with the first multicast service, and the G-RNTI and/or the multicast service identifier are/is associated with the first indication information.

In at least one embodiment, the first indication information indicates, by using a bit or a field, to provide a feedback for the first multicast service; and/or the first indication information is for indicating a transmission resource of the first feedback information.

In at least one embodiment, the first indication information includes a signal quality parameter threshold; and in response to a value of a signal quality parameter corresponding to the first multicast service being less than or equal to the threshold, the communication unit 1303 sends the first feedback information to the network device.

In at least one embodiment, the communication unit 1303 is further configured to receive second multicast configuration information from the network device, where the second multicast configuration information corresponds to a second multicast service, the second multicast configuration information includes second indication information, and the second indication information is for indicating that the terminal device does not send feedback information for the second multicast service.

In at least one embodiment, the communication unit 1303 is further configured to send the first feedback information corresponding to the first multicast service and/or second feedback information corresponding to a unicast service to the network device based on a priority of the feedback information.

In at least one embodiment, the priority of the feedback information is determined based on third indication information, and the third indication information is from the network device; or the priority of the feedback information is predefined.

In at least one embodiment, the third indication information is carried in DCI, and the DCI is for scheduling a physical downlink shared channel PDSCH that carries the first multicast service; or the third indication information is carried in a radio resource control RRC message.

In at least one embodiment, the communication unit 1303 is further configured to send feedback stopping acknowledgment information to the network device, where the feedback stopping acknowledgment information is for indicating that sending of the feedback information for the first multicast service is stopped.

In at least one embodiment, the communication unit 1303 is further configured to send the feedback stopping acknowledgment information to the network device based on a predefined parameter or fourth indication information that is from the network device, where the fourth indication information is for triggering the terminal device to send the feedback stopping acknowledgment information to the network device.

In at least one embodiment, the feedback stopping acknowledgment information is indicated by a logical channel identifier LCID, and the LCID is carried in a media access control MAC subheader; or the feedback stopping acknowledgment information is indicated by fifth indication information in a MAC control element CE; or the feedback stopping acknowledgment information is indicated by a length of a MAC CE.

In at least one embodiment, the communication unit 1303 is further configured to send feedback capability information to the network device, where the feedback capability information is for indicating a capability of sending unicast feedback information and multicast feedback information on a same feedback resource, the unicast feedback information is feedback information corresponding to a unicast service, and the multicast feedback information is feedback information corresponding to a multicast service.

The apparatus 1300 is the network device in any one of the foregoing embodiments, or is a chip disposed in the network device. The processing unit 1302 supports the apparatus 1300 in performing actions of the network device in the foregoing method examples. Alternatively, the processing unit 1302 mainly performs an internal action of the network device in the method examples, and the communication unit 1303 supports communication between the apparatus 1300 and a terminal device. For example, the communication unit 1303 is configured to perform step 501, step 503, and step 507 in FIG. 5; step 701, step 701*a*, step 701*b*, step 703, and step 707 in FIG. 7A and FIG. 7B; step 801, step 803, step 805, step 807, and step 810 in FIG. 8; step 901 and step 903 in FIG. 9; and step 1002, step 1003, step 1005, and step 1006 in FIG. 10. The processing unit 1302 is configured to perform step 1002 in FIG. 10.

In at least one embodiment, the first multicast configuration information further includes a group radio network temporary identifier G-RNTI and/or a multicast service identifier that are/is associated with the first multicast service, and the G-RNTI and/or the multicast service identifier are/is associated with the first indication information.

In at least one embodiment, the first indication information indicates, by using a bit or a field, to provide a feedback for the first multicast service; and/or the first indication information is for indicating a transmission resource of the first feedback information.

In at least one embodiment, the first indication information includes a signal quality parameter threshold.

In at least one embodiment, before the communication unit 1303 sends the first multicast configuration information to the terminal device, the processing unit 202 is configured to determine, based on at least one of a service requirement of the first multicast service, a physical relative distance between the terminal device and the network device, and channel quality of the terminal device, the terminal device that sends the feedback information for the first multicast service.

In at least one embodiment, the communication unit 1303 is further configured to send second multicast configuration information to the terminal device, where the second multicast configuration information corresponds to a second multicast service, the second multicast configuration information includes second indication information, and the second indication information is for indicating that the terminal device does not send feedback information for the second multicast service.

In at least one embodiment, before receiving the first feedback information from the terminal device, the communication unit 1303 is further configured to send third indication information to the terminal device, where the third indication information is for indicating a priority of the feedback information of the first multicast service.

In at least one embodiment, the third indication information is carried in downlink control information DCI, and the DCI is for scheduling a physical downlink shared channel PDSCH that carries the first multicast service.

In at least one embodiment, the communication unit 1303 is configured to: send fourth indication information to the terminal device, where the fourth indication information is for indicating the terminal device to stop sending the feedback information for the first multicast service; and receive feedback stopping acknowledgment information from the terminal device, where the feedback stopping acknowledgment information is for indicating that the terminal device stops sending the feedback information for the first multicast service.

In at least one embodiment, the feedback stopping acknowledgment information is indicated by a logical channel identifier LCID, and the LCID is carried in a media access control MAC subheader; or the feedback stopping acknowledgment information is indicated by fifth indication information in a MAC control element CE; or the feedback stopping acknowledgment information is indicated by a length of a MAC CE.

In at least one embodiment, the communication unit 1303 is further configured to receive feedback capability information from the terminal device, where the feedback capability information is for indicating a capability of sending unicast feedback information and multicast feedback information on a same feedback resource by the terminal device, the unicast feedback information is feedback information corresponding to a unicast service, and the multicast feedback information is feedback information corresponding to a multicast service.

Division into the units in the foregoing apparatus is understood to merely be logical function division. During actual implementation, all or some of the units are integrated into one physical entity, or are physically separated. In addition, all the units in the apparatus are implemented in a form of software invoked by a processing element, or are implemented in a form of hardware; or some units are implemented in a form of software invoked by a processing element, and some units are implemented in a form of hardware. For example, a unit is an independently disposed processing element, or is integrated into a chip of the apparatus for implementation. Alternatively, a unit is stored in a memory in a form of a program to be invoked by a processing element of the apparatus to perform a function of the unit. In addition, all or some of the units are integrated together, or are implemented independently. The processing element herein may also be referred to as a processor, and is an integrated circuit having a signal processing capability. In an implementation process, the steps in the foregoing methods or the foregoing units are implemented by using a hardware integrated logic circuit in the processing element, or are implemented in a form of software invoked by the processing element.

In an example, the unit in any one of the foregoing apparatuses is one or more integrated circuits configured to implement the foregoing methods, for example, one or more application-specific integrated circuits (Application-Specific Integrated Circuits, ASICs), or one or more microprocessors (digital signal processors, DSPs), or one or more field programmable gate arrays (Field Programmable Gate Arrays, FPGAs), or a combination of at least two of these integrated circuit forms. For another example, in response to the unit in the apparatus being implemented by scheduling a program by a processing element, the processing element is a processor, for example, a central processing unit (central processing unit, CPU) or another processor that invokes the program. For another example, the units are integrated and implemented in a form of a system-on-a-chip (system-on-a-chip, SoC).

The foregoing receiving unit is an interface circuit of the apparatus, and is configured to receive a signal from another apparatus. For example, in response to the apparatus being implemented by a chip, the receiving unit is an interface circuit that is of the chip and that is configured to receive a signal from another chip or apparatus. The foregoing sending unit is an interface circuit of the apparatus, and is configured to send a signal to another apparatus. For example, in response to the apparatus being implemented by a chip, the sending unit is an interface circuit that is of the chip and that is configured to send a signal to another chip or apparatus.

Figure 14:
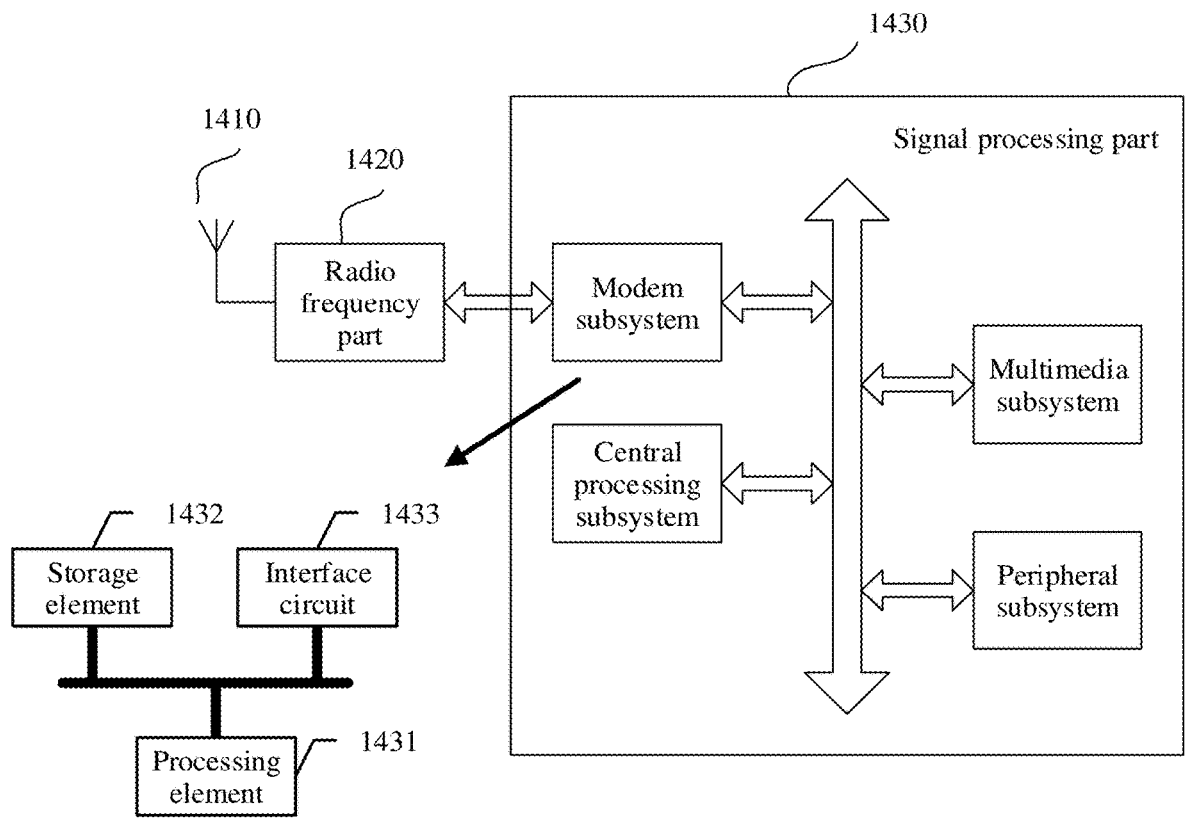
FIG. 14 is a schematic diagram of a structure of a terminal device according to at least one embodiment.

FIG. 14 is a schematic diagram of a structure of a terminal device according to an embodiment of this application. The terminal device is the terminal device in the foregoing embodiments, and is configured to implement operations of the terminal device in the foregoing embodiments. As shown in FIG. 14, the terminal device includes an antenna 1410, a radio frequency part 1420, and a signal processing part 1430. The antenna 1410 is connected to the radio frequency part 1420. In a downlink direction, the radio frequency part 1420 receives, through the antenna 1410, information sent by a network device, and sends, to the signal processing part 1430 for processing, the information sent by the network device. In an uplink direction, the signal processing part 1430 processes information of the terminal device, and sends the information to the radio frequency part 1420. The radio frequency part 1420 processes the information of the terminal device, and then sends the processed information to the network device through the antenna 1410.

The signal processing part 1430 includes a modem subsystem, configured to process data at a communication protocol layer. The signal processing part 1430 further includes a central processing subsystem, configured to implement processing of an operating system and an application layer of the terminal device. In addition, the signal processing part 1430 further includes another subsystem, for example, a multimedia subsystem or a peripheral subsystem. The multimedia subsystem is configured to control a camera, a screen display, or the like of the terminal device, and the peripheral subsystem is configured to implement a connection to another device. The modem subsystem is a chip that is separately disposed.

The modem subsystem includes one or more processing elements 1431, for example, include one main control CPU and another integrated circuit. In addition, the modem subsystem further includes a storage element 1432 and an interface circuit 1433. The storage element 1432 is configured to store data and a program. However, a program used to perform the method performed by the terminal device in the foregoing methods is not stored in the storage element 1432, but is stored in a memory outside the modem subsystem, and is loaded and used by the modem subsystem. The interface circuit 1433 is configured to communicate with another subsystem.

The modem subsystem is implemented by a chip. The chip includes at least one processing element and an interface circuit. The processing element is configured to perform the steps in any one of the methods performed by the terminal device. The interface circuit is configured to communicate with another apparatus. In at least one embodiment, units in the terminal device for implementing the steps in the foregoing methods are implemented by scheduling a program by a processing element. For example, an apparatus used in the terminal device includes a processing element and a storage element. The processing element invokes a program stored in the storage element, to perform the method performed by the terminal device in the foregoing method embodiments. The storage element is a storage element located on a same chip as the processing element, that is, an on-chip storage element.

In at least one embodiment, a program used to perform the method performed by the terminal device in the foregoing methods is in a storage element located on a different chip from the processing element, that is, an off-chip storage element. In this case, the processing element invokes or loads the program from the off-chip storage element to an on-chip storage element, to invoke and perform the method performed by the terminal device in the foregoing method embodiments.

In at least one embodiment, units in the terminal device for implementing the steps in the foregoing methods are configured as one or more processing elements. The processing elements are disposed in the modem subsystem. The processing element herein is an integrated circuit, for example, one or more ASICs, one or more DSPs, one or more FPGAs, or a combination of these types of integrated circuits. These integrated circuits are integrated to form a chip.

Units in the terminal device for implementing the steps in the foregoing methods are integrated together, and implemented in a form of a SoC. The SoC chip is configured to implement the foregoing methods. At least one processing element and storage element are integrated into the chip, and the processing element invokes a program stored in the storage element to implement the foregoing method performed by the terminal device. Alternatively, at least one integrated circuit is integrated into the chip, to implement the foregoing methods performed by the terminal device. Alternatively, with reference to the foregoing embodiments, functions of some units are implemented by invoking a program by the processing element, and functions of some units are implemented by the integrated circuit.

The foregoing apparatus used in the terminal device includes at least one processing element and an interface circuit. The at least one processing element is configured to perform any one of the methods that are provided in the foregoing method embodiments and performed by the terminal device. The processing element performs some or all steps performed by the terminal device in a first manner, to be specific, by invoking the program stored in the storage element; or performs some or all steps performed by the terminal device in a second manner, to be specific, by using a hardware integrated logic circuit in the processing element in combination with instructions; or performs, by combining the first manner and the second manner, some or all steps performed by the terminal device.

The processing element herein is the same as that described above, and is implemented by using a processor. A function of the processing element is the same as a function of the processing unit described in FIG. 13. For example, the processing element is a general-purpose processor, for example, a CPU, or is one or more integrated circuits configured to implement the foregoing methods, for example, one or more ASICs, one or more microprocessors DSPs, one or more FPGAs, or a combination of at least two of the integrated circuit forms. The storage element is implemented by using a memory. A function of the storage element is the same as a function of the storage unit described in FIG. 14. The storage element is implemented by using a memory. A function of the storage element is the same as a function of the storage unit described in FIG. 14. The storage element is one memory, or an umbrella term of a plurality of memories.

The terminal device shown in FIG. 14 implements the processes related to the terminal device in the method embodiment shown in FIG. 5, FIG. 7A and FIG. 7B, or FIG. 8. Operations and/or functions of the modules in the terminal device shown in FIG. 14 are intended to implement the corresponding procedures in the foregoing method embodiments. For details, refer to the descriptions in the foregoing method embodiments. To avoid repetition, detailed descriptions are properly omitted herein.

Figure 15:
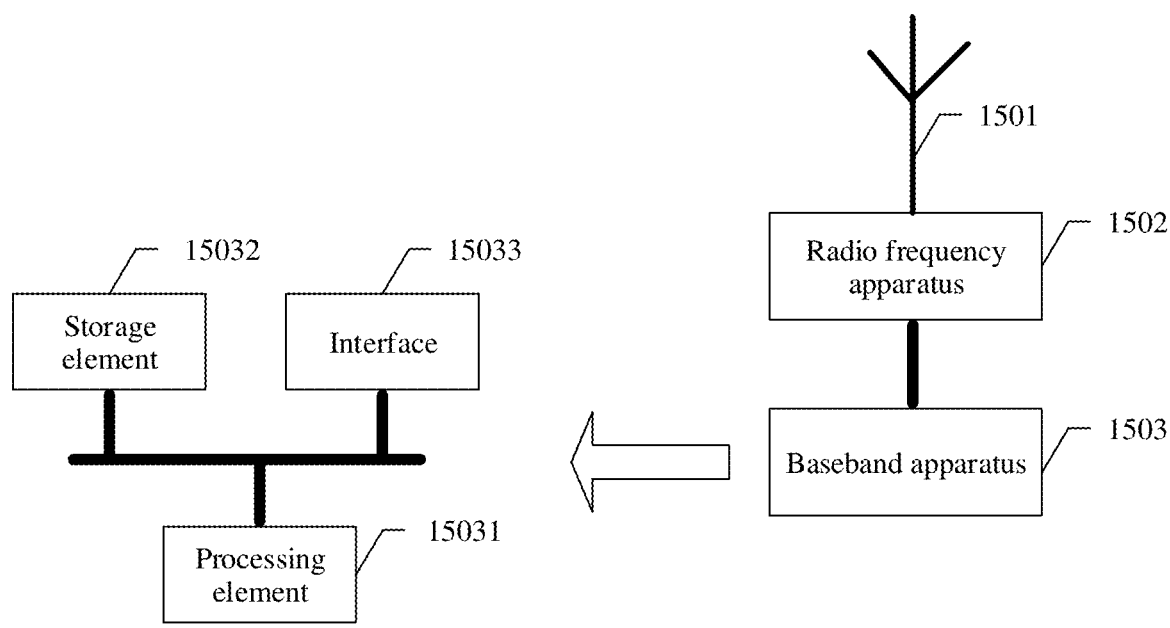
FIG. 15 is a schematic diagram of a structure of a network device according to at least one embodiment.

FIG. 15 is a schematic diagram of a structure of a network device according to an embodiment of this application. The network device is configured to implement operations of the network device in the foregoing embodiments. As shown in FIG. 15, the network device includes an antenna 1501, a radio frequency apparatus 1502, and a baseband apparatus 1503. The antenna 1501 is connected to the radio frequency apparatus 1502. In an uplink direction, the radio frequency apparatus 1502 receives, through the antenna 1501, information sent by a terminal device, and sends, to the baseband apparatus 1503 for processing, the information sent by the terminal device. In a downlink direction, the baseband apparatus 1503 processes information of the terminal device, and sends the information to the radio frequency apparatus 1502. The radio frequency apparatus 1502 processes the information of the terminal device, and then sends the processed information to the terminal device through the antenna 1501.

The baseband apparatus 1503 includes one or more processing elements 15031, for example, include one main control CPU and another integrated circuit. In addition, the baseband apparatus 1503 further includes a storage element 15032 and an interface 15033. The storage element 15032 is configured to store a program and data. The interface 15033 is configured to exchange information with the radio frequency apparatus 1502, and the interface is, for example, a common public radio interface (common public radio interface, CPRI). The foregoing apparatus used in the network device is located in the baseband apparatus 1503. For example, the foregoing apparatus used in the network device is a chip on the baseband apparatus 1503. The chip includes at least one processing element and an interface circuit. The processing element is configured to perform the steps in any one of the methods performed by the network device. The interface circuit is configured to communicate with another apparatus. In at least one embodiment, units in the network device for implementing the steps in the foregoing methods is implemented by scheduling a program by a processing element. For example, the apparatus used in the network device includes a processing element and a storage element. The processing element invokes a program stored in the storage element, to perform the method performed by the network device in the foregoing method embodiments. The storage element is a storage element that is located on a same chip as the processing element, that is, an on-chip storage element, or is a storage element that is located on a different chip from the processing element, that is, an off-chip storage element.

In at least one embodiment, units in the network device for implementing the steps in the foregoing methods are configured as one or more processing elements. The processing elements are disposed in the baseband apparatus. The processing element herein is an integrated circuit, for example, one or more ASICs, one or more DSPs, one or more FPGAs, or a combination of these types of integrated circuits. These integrated circuits are integrated to form a chip.

Units in the network device for implementing the steps in the foregoing methods are integrated together, and implemented in a form of a system-on-a-chip (system-on-a-chip, SoC). For example, the baseband apparatus includes the SoC chip, configured to implement the foregoing methods. At least one processing element and storage element are integrated into the chip, and the processing element invokes a program stored in the storage element to implement the foregoing method performed by the network device. Alternatively, at least one integrated circuit is integrated into the chip, to implement the foregoing methods performed by the network device. Alternatively, with reference to the foregoing embodiments, functions of some units are implemented by invoking a program by the processing element, and functions of some units are implemented by the integrated circuit.

The foregoing apparatus used in the network device includes at least one processing element and an interface circuit. The at least one processing element is configured to perform any one of the methods that are provided in the foregoing method embodiments and performed by the network device. The processing element performs some or all steps performed by the network device in a first manner, to be specific, by invoking the program stored in the storage element; or performs some or all steps performed by the network device in a second manner, to be specific, by using a hardware integrated logic circuit in the processing element in combination with instructions; or performs, by combining the first manner and the second manner, some or all steps performed by the network device.

The processing element herein is the same as that described above, and is implemented by using a processor. A function of the processing element is the same as a function of the processing unit described in FIG. 10. For example, the processing element is a general-purpose processor, for example, a CPU, or is one or more integrated circuits configured to implement the foregoing methods, for example, one or more ASICs, one or more microprocessors DSPs, one or more FPGAs, or a combination of at least two of the integrated circuit forms. The storage element is implemented by using a memory. A function of the storage element is the same as a function of the storage unit described in FIG. 12. The storage element is implemented by using a memory. A function of the storage element is the same as a function of the storage unit described in FIG. 10. The storage element is one memory, or an umbrella term of a plurality of memories.

The network device shown in FIG. 14 implements the processes related to the network device in the method embodiments shown in FIG. 5, and FIG. 7A to FIG. 10. Operations and/or functions of the modules in the network device shown in FIG. 14 are intended to implement the corresponding procedures in the foregoing method embodiments. For details, refer to the descriptions in the foregoing method embodiments. To avoid repetition, detailed descriptions are properly omitted herein.

A person skilled in the art understands that embodiments of this application are provided as a method, a system, or a computer program product. Therefore, this application uses a form of hardware only embodiments, software only embodiments, or embodiments with a combination of software and hardware. Moreover, this application uses a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. Computer program instructions are used to implement each process and/or each block in the flowcharts and/or the block diagrams and a combination of a process and/or a block in the flowcharts and/or the block diagrams. These computer program instructions are provided for a general-purpose computer, a dedicated computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

These computer program instructions are alternatively stored in a computer-readable memory that indicates a computer or another programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

These computer program instructions are alternatively loaded onto a computer or another programmable data processing device, so that a series of operations and steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

Clearly, a person skilled in the art is able to make various modifications and variations to this application without departing from the spirit and scope of this application. In this way, this application is intended to cover these modifications and variations of this application provided that they fall within the scope of the claims of this application and their equivalent technologies.

What is claimed is:

1. A communication method, comprises:
receiving multimedia broadcast multicast service subframe configuration from a network device, wherein the multimedia broadcast multicast service subframe configuration indicates subframes for receiving a downlink multimedia broadcast multicast service single frequency network (MBSFN) service;
determining a subcarrier spacing configured with a specific value;
determining a minimum time unit corresponding to the subcarrier spacing;
determining whether the minimum time unit satisfies a valid minimum time unit condition; and
receiving the downlink MBSFN service in the valid minimum time unit in response to the minimum time unit satisfying the valid minimum time unit condition, the valid minimum time unit condition being that all subframes corresponding to the minimum time unit are used for the downlink MBSFN service.

2. The method according to claim 1, wherein the specific value is 0.37 kHz, and the minimum time unit is a slot of 3 ms.

3. The method according to claim 1, wherein the multimedia broadcast multicast service subframe configuration is MBSFN-SubframeConfig.

4. The method according to claim 1, wherein the multimedia broadcast multicast service subframe configuration includes a radio frame allocation period, a radio frame allocation offset, and a subframe allocation; wherein
the radio frame allocation period and the radio frame allocation offset indicate a radio frame for receiving the downlink MBSFN service, and the subframe allocation indicates the subframes for receiving the downlink MBSFN service in the radio frame.

5. A communication method, comprises:
sending multimedia broadcast multicast service subframe configuration to a terminal device, wherein the multimedia broadcast multicast service subframe configuration indicates subframes for sending a downlink multimedia broadcast multicast service single frequency network (MBSFN) service;
determining a subcarrier spacing configured with a specific value;
determining a minimum time unit corresponding to the subcarrier spacing;
determining whether the minimum time unit satisfies a valid minimum time unit condition; and
sending the downlink MBSFN service in the valid minimum time unit in response to the minimum time unit satisfying the valid minimum time unit condition, the valid minimum time unit condition being that all subframes corresponding to the minimum time unit are used for the downlink MBSFN service.

6. The method according to claim 5, wherein the specific value is 0.37 kHz, and the minimum time unit is a slot of 3 ms.

7. The method according to claim 5, wherein the multimedia broadcast multicast service subframe configuration is MBSFN-SubframeConfig.

8. The method according to claim 5, wherein the multimedia broadcast multicast service subframe configuration includes a radio frame allocation period, a radio frame allocation offset, and a subframe allocation; wherein
the radio frame allocation period and the radio frame allocation offset indicate a radio frame for sending the downlink MBSFN service, and the subframe allocation indicates the subframes for sending the downlink MBSFN service in the radio frame.

9. An apparatus, comprising:
one or more processors; and
one or more memories coupled to the one or more processors and storing programming instructions for execution by the one or more processors to cause the apparatus to perform a method comprising:
receiving multimedia broadcast multicast service subframe configuration from a network device, wherein the multimedia broadcast multicast service subframe configuration indicates subframes for receiving a downlink multimedia broadcast multicast service single frequency network (MBSFN) service;
determining a subcarrier spacing configured with a specific value;
determining a minimum time unit corresponding to the subcarrier spacing;
determining whether the minimum time unit satisfies a valid minimum time unit condition; and
receiving the downlink MBSFN service in the valid minimum time unit in response to the minimum time unit satisfying the valid minimum time unit condition, the valid minimum time unit condition being that all subframes corresponding to the minimum time unit are used for the downlink MBSFN service.

10. The apparatus according to claim 9, wherein the specific value is 0.37 kHz, and the minimum time unit is a slot of 3 ms.

11. The apparatus according to claim 9, wherein the multimedia broadcast multicast service subframe configuration is MBSFN-SubframeConfig.

12. The apparatus according to claim 9, wherein the multimedia broadcast multicast service subframe configuration includes a radio frame allocation period, a radio frame allocation offset, and a subframe allocation; wherein
the radio frame allocation period and the radio frame allocation offset indicate a radio frame for receiving the downlink MBSFN service, and the subframe allocation indicates the subframes for receiving the downlink MBSFN service in the radio frame.

13. An apparatus, comprising:
one or more processors; and
one or more memories coupled to the one or more processors and storing programming instructions for execution by the one or more processors to cause the apparatus to perform a method comprising:
sending multimedia broadcast multicast service subframe configuration to a terminal device, wherein the multimedia broadcast multicast service subframe configuration indicates subframes for sending a downlink multimedia broadcast multicast service single frequency network (MBSFN) service;
determining a subcarrier spacing configured with a specific value;
determining a minimum time unit corresponding to the subcarrier spacing;
determining whether the minimum time unit satisfies a valid minimum time unit condition; and
sending the downlink MBSFN service in the valid minimum time unit in response to the minimum time unit satisfying the valid minimum time unit condition, the valid minimum time unit condition being that all subframes corresponding to the minimum time unit are used for the downlink MBSFN service.

14. The apparatus according to claim 13, wherein the specific value is 0.37 kHz, and the minimum time unit is a slot of 3 ms.

15. The apparatus according to claim 13, wherein the multimedia broadcast multicast service subframe configuration is MBSFN-SubframeConfig.

16. The apparatus according to claim 13, wherein the multimedia broadcast multicast service subframe configuration includes a radio frame allocation period, a radio frame allocation offset, and a subframe allocation; wherein
the radio frame allocation period and the radio frame allocation offset indicate a radio frame for sending the downlink MBSFN service, and the subframe allocation indicates the subframes for sending the downlink MBSFN service in the radio frame.

17. The method according to claim 1, wherein the all subframes corresponding to the minimum time unit used for the downlink MBSFN service has a quantity of subframes equal to 3.

18. The method according to claim 1, wherein the minimum time unit is numbered in increasing order from 0 to 12 in a 40 millisecond (ms) period starting at nf mod 4=0, where nf is a radio frame number.

19. The method according to claim 18, wherein the minimum time unit with a number 0 starts at 1 ms in the 40 ms period.

20. The method according to claim 5, wherein the minimum time unit is numbered in increasing order from 0 to 12 in a 40 millisecond (ms) period starting at nf mod 4=0, where nf is a radio frame number.

21. The method according to claim 20, wherein the minimum time unit with a number 0 starts at 1 ms in the 40 ms period.

22. The apparatus according to claim 9, wherein the minimum time unit is numbered in increasing order from 0 to 12 in a 40 millisecond (ms) period starting at nf mod 4=0, where nf is a radio frame number.

23. The apparatus according to claim 22, wherein the minimum time unit with a number 0 starts at 1 ms in the 40 ms period.

24. The apparatus according to claim 13, wherein the minimum time unit is numbered in increasing order from 0 to 12 in a 40 millisecond (ms) period starting at nf mod 4-0, where nf is a radio frame number.

25. The apparatus according to claim 24, wherein the minimum time unit with a number 0 starts at 1 ms in the 40 ms period.

* * * * *